(12) United States Patent
Matulic

(10) Patent No.: US 8,726,178 B2
(45) Date of Patent: May 13, 2014

(54) DEVICE, METHOD, AND COMPUTER PROGRAM PRODUCT FOR INFORMATION RETRIEVAL

(75) Inventor: Fabrice Matulic, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1600 days.

(21) Appl. No.: 11/935,615

(22) Filed: Nov. 6, 2007

(65) Prior Publication Data

US 2008/0115080 A1     May 15, 2008

(30) Foreign Application Priority Data

Nov. 10, 2006    (JP) .................................. 2006-305835
Oct. 9, 2007    (JP) .................................. 2007-262885

(51) Int. Cl.
    *G06F 3/00*          (2006.01)
    *G06F 3/0481*      (2013.01)

(52) U.S. Cl.
    CPC ................................ *G06F 3/0481* (2013.01)
    USPC .......................................... 715/764; 715/769

(58) Field of Classification Search
    CPC ............................ G06F 3/0481; G06F 3/0486
    USPC .................................................. 715/764, 769
    See application file for complete search history.

(56) References Cited

U.S. PATENT DOCUMENTS

| | | | |
|---|---|---|---|
| 5,926,824 A * | 7/1999 | Hashimoto | 715/210 |
| 6,353,840 B2 * | 3/2002 | Saito et al. | 715/202 |
| 6,397,213 B1 * | 5/2002 | Cullen et al. | 1/1 |
| 2002/0129140 A1 * | 9/2002 | Peled et al. | 709/224 |
| 2002/0154817 A1 * | 10/2002 | Katsuyama et al. | 382/190 |
| 2003/0212666 A1 * | 11/2003 | Basu et al. | 707/3 |
| 2004/0213458 A1 * | 10/2004 | Kanatsu | 382/181 |
| 2004/0267730 A1 * | 12/2004 | Dumais et al. | 707/3 |
| 2005/0275897 A1 * | 12/2005 | Fan et al. | 358/2.1 |
| 2006/0004728 A1 * | 1/2006 | Gotoh | 707/3 |
| 2006/0206462 A1 * | 9/2006 | Barber | 707/3 |
| 2006/0210162 A1 * | 9/2006 | Sato | 382/176 |
| 2006/0218115 A1 * | 9/2006 | Goodman et al. | 707/1 |
| 2007/0036468 A1 * | 2/2007 | Matsushita et al. | 382/305 |
| 2007/0133074 A1 | 6/2007 | Fabrice | |
| 2007/0220425 A1 | 9/2007 | Matulic | |
| 2007/0230778 A1 | 10/2007 | Matulic | |
| 2007/0253643 A1 * | 11/2007 | Nagarajan | 382/305 |

FOREIGN PATENT DOCUMENTS

| | | |
|---|---|---|
| CN | 1716253 A | 1/2006 |
| JP | 2000-231568 | 8/2000 |
| JP | 2002-112022 | 4/2002 |
| JP | 2003-50817 | 2/2003 |
| JP | 2004-220424 | 8/2004 |
| JP | 2005-135041 | 5/2005 |
| JP | 2005-244411 | 9/2005 |
| JP | 2006-18630 | 1/2006 |
| JP | 2007-150858 | 6/2007 |

* cited by examiner

*Primary Examiner* — Tuyetlien Tran
(74) *Attorney, Agent, or Firm* — Dickstein Shapiro LLP

(57) ABSTRACT

An information retrieval device includes an area splitting unit that splits the input information into a plurality of subareas by each information attribute, an extracting unit that extracts a retrieval key from the input information in each of the subareas, a display control unit that displays the input information in the subareas on a first screen, and receives an instruction for specifying any of the subareas displayed on the first screen to be moved to a second screen on a display unit, and a retrieving unit that retrieves information via the network based on a retrieval key corresponding to the subarea that is moved to the second screen. The display control unit displays retrieved information on the second screen.

16 Claims, 24 Drawing Sheets

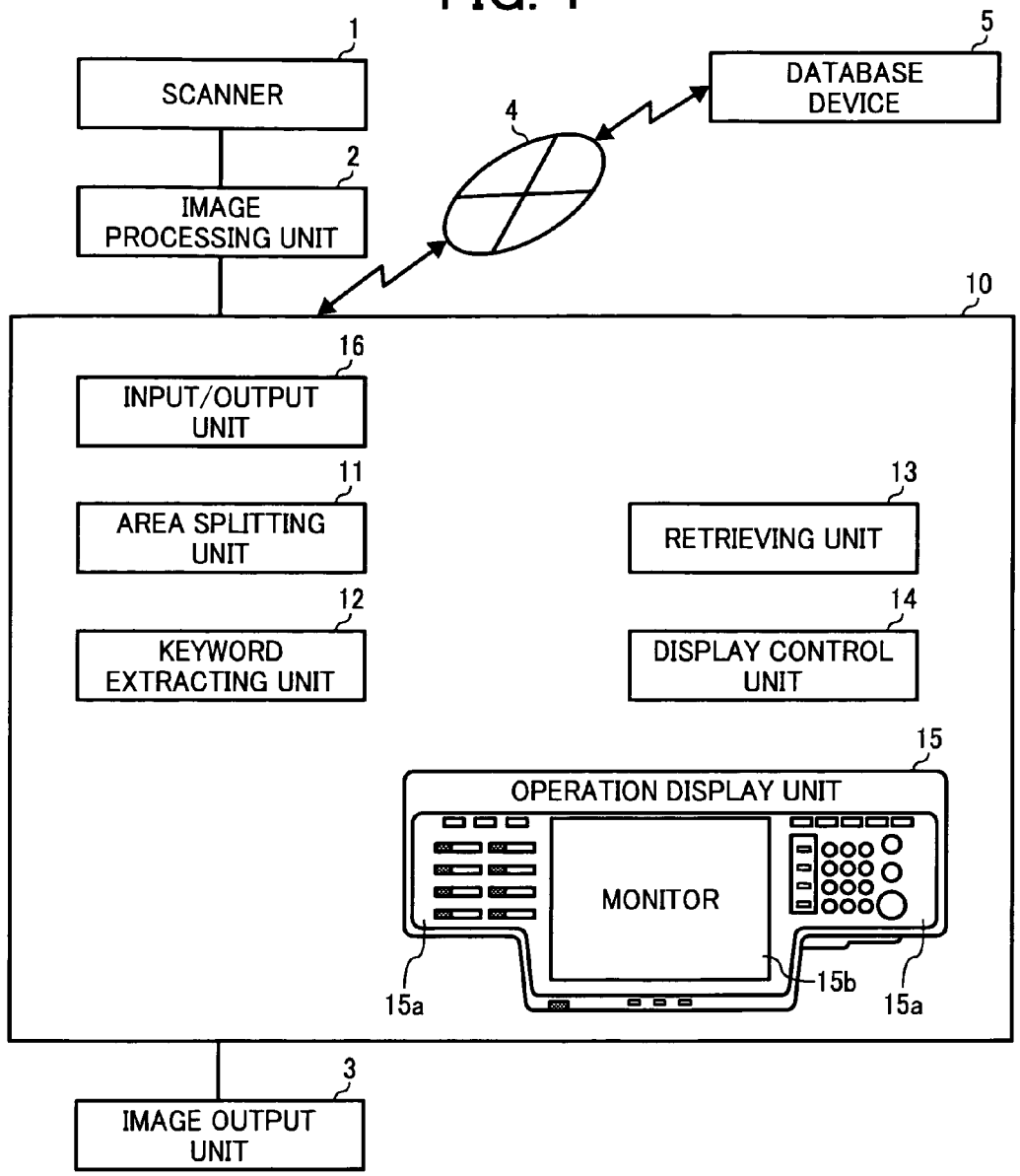
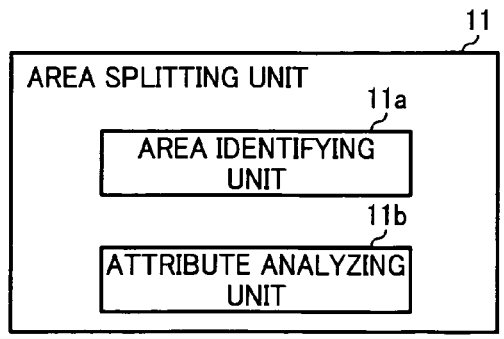

US 8,726,178 B2

DEVICE, METHOD, AND COMPUTER PROGRAM PRODUCT FOR INFORMATION RETRIEVAL

CROSS-REFERENCE TO RELATED APPLICATIONS

The present application claims priority to and incorporates by reference the entire contents of Japanese priority document 2006-305835 filed in Japan on Nov. 10, 2006 and Japanese priority document 2007-262885 filed in Japan on Oct. 9, 2007.

BACKGROUND OF THE INVENTION

1. Field of the Invention

The present invention relates to a technology for retrieving information on a network.

2. Description of the Related Art

Various techniques are available for retrieving desired documents. In one such technique, documents are registered as database in a personal computer (PC), and when a character string is input by a user via a keyword digital data relevant to the keyword is retrieved from the database.

For example, a document retrieval device disclosed in Japanese Patent Application Laid-open No. 2000-231568 acquires a plurality of schedule information, which is managed separate from documents subjected to be retrieved, and displays the acquired schedule information on a display screen. When one of the displayed schedule information is selected by a user, the document retrieval device extracts a character string as a keyword from the selected schedule information, and retrieves a digital document relevant to the extracted keyword from the documents subjected to be retrieved.

As described above, the document retrieval device disclosed in Japanese Patent Application Laid-open No. 2000-231568 can handle only digital documents. However, a majority of information existing in the actual world is not digital information but paper-based information such as a newspaper and a magazine. In other words, the document retrieval device disclosed in Japanese Patent Application Laid-open No. 2000-231568 cannot handle the majority of the information existing in the actual world.

SUMMARY OF THE INVENTION

It is an object of the present invention to at least partially solve the problems in the conventional technology.

According to an aspect of the present invention, there is provided an information retrieval device that is connected to a network and that includes a display unit that includes a first screen on which input information received from an input unit is displayed and a second screen on which a result of retrieval is displayed, the first screen and the second screen enabling to receive an operational input from a user; an area splitting unit that splits the input information into a plurality of subareas by each information attribute; an extracting unit that extracts a retrieval key from the input information in each of the subareas; a display control unit that displays the input information in the subareas on the first screen, and receives an instruction for specifying any of the subareas displayed on the first screen to be moved to the second screen; and a retrieving unit that retrieves information via the network based on a retrieval key corresponding to the subarea that is moved to the second screen, wherein the display control unit displays retrieved information on the second screen.

According to another aspect of the present invention, there is provided a method of retrieving information from a network including displaying a first screen on a display unit on which input information received from an input unit is displayed and a second screen on which a result of retrieval is displayed, the first screen and the second screen enabling to receive an operational input from a user; splitting the input information into a plurality of subareas by each information attribute; extracting a retrieval key from the input information in each of the subareas; providing a control to display the input information in the subareas on the first screen, and receiving an instruction for specifying any of the subareas displayed on the first screen to be moved to the second screen; and retrieving information via the network based on a retrieval key corresponding to the subarea that is moved to the second screen, wherein providing a control includes displaying retrieved information on the second screen.

According to still another aspect of the present invention, there is provided a computer program product that contains a computer program which when executed on a computer causes the computer to execute the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of an image forming apparatus including a document retrieval device according to a first embodiment of the present invention;

FIG. 2 is a block diagram of an area splitting unit shown in FIG. 1;

DETAILED DESCRIPTION OF THE PREFERRED EMBODIMENTS

Figure 3:
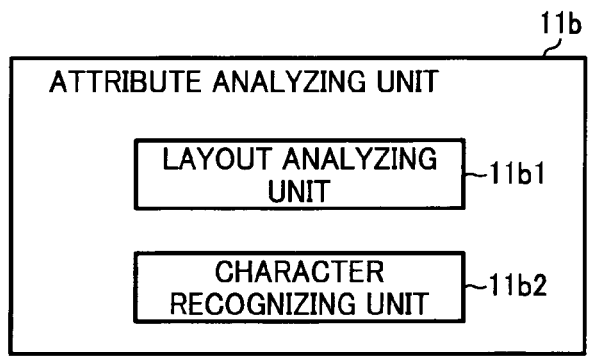
FIG. 3 is a block diagram of an attribute analyzing unit shown in FIG. 2.

Exemplary embodiments of the present invention are explained in detail below with reference to the accompanying drawings.

A document retrieval device according to a first embodiment of the present invention is included in an image forming apparatus. When a document is scanned by a scanner included in the image forming apparatus, the document retrieval device automatically reads out text data from the scanned document data, and extracts a keyword from the text data. The document retrieval device retrieves document data relevant to the extracted keyword from other database devices connected to the document retrieval device via a network, and displays the retrieved document data on a monitor. In this manner, by just scanning a document, the image forming apparatus including the document retrieval device can easily retrieve document data relevant to content of the scanned document data from the database devices on the network, so that the users need not perform any cumbersome keyboard operation. The image forming apparatus including the document retrieval device according to the first embodiment is explained in detail below.

FIG. 1 is a block diagram of the image forming apparatus including a document retrieval device 10 according to the first embodiment. The image forming apparatus includes a scanner 1, an image processing unit 2, an image output unit 3, and the document retrieval device 10. The image forming apparatus is connected to a database device 5 via a network 4.

The document retrieval device 10 includes an area splitting unit 11, a keyword extracting unit 12, a retrieving unit 13, a display control unit 14, an operation display unit 15, and an input/output unit 16. The image processing unit 2 performs an image transformation process, such as a digital transformation or a gamma transformation, with respect to a document image acquired by the scanner 1 thereby generating, for example, a bitmapped image. The image processing unit 2 sends the processed document image to the input/output unit 16.

The input/output unit 16 sends the document image to the area splitting unit 11. The area splitting unit 11 splits the document image into an image area, which contains image data, and a non-image area, which contains data other than image data. The area splitting unit 11 analyzes the image data included in the image area, and extracts document components from the image data. The document components can be a text, a picture image such as a photo, a chart, or a headline. The document components generally occupy a major portion of the document.

The area splitting unit 11 also analyzes an attribute of each of the document components, and splits the image area into a plurality of subareas by each attribute. The attributes can be a text, a chart, a picture image, or others.

FIG. 2 is a detailed block diagram of the area splitting unit 11. The area splitting unit 11 includes an area identifying unit 11a and an attribute analyzing unit 11b. The area identifying unit 11a identifies what type of and where the subareas are present in the scanned document data. A subarea corresponds to each paragraph if an area attribute is the text, and by each chart if an area attribute is the chart, and by each picture image if an area attribute is the picture image.

The area identifying unit 11a identifies the subareas depending on whether there is a change in concentration, whether there is an edge, or whether there is a halftone area, and the like. For example, upon detecting a series of portions determined as characters based on difference in concentration, the area identifying unit 11a identifies those portions as a text area. Upon detecting a series of halftone pixel in an area, the area identifying unit 11a identifies that area as a picture image subarea. Similarly, upon detecting an edge portion and a significant difference in color density in an area, the area identifying unit 11a identifies that area as a chart subarea. As for other subareas, the area identifying unit 11a identifies the subareas as a subarea including a combination of a text, a picture, and a chart or a subarea other than the subarea including the combination, and identifies each of the subareas by using the common area identifying method.

The attribute analyzing unit 11b analyzes an attribute of each of the subareas identified by the area identifying unit 11a, i.e., analyzes whether the subarea includes any of a text image, a picture image, a halftone image, a chart image, and other images. In the result, each identified subarea is analyzed by each data attribute, i.e., the document data is split into subareas by each data attribute. Elements of the subareas split by each data attribute are taken as the document components.

FIG. 3 is a block diagram of the attribute analyzing unit 11b. The attribute analyzing unit 11b includes a layout analyzing unit 11b1 and a character recognizing unit 11b2. The layout analyzing unit 11b1 analyzes a layout of the document data based on the document components extracted by the area identifying unit 11a. The layout analyzing unit 11b1 performs a layout analysis in such a manner that the common algorithm is applied to detected information, such as an edge, a halftone, and a pixel position, and thereby analyzing a layout of the subareas.

Figure 4:
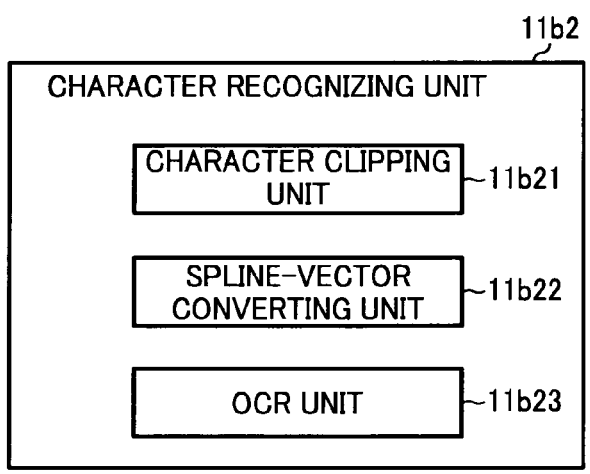
FIG. 4 is a block diagram of a character recognizing unit shown in FIG. 3.

FIG. 4 is a block diagram of the character recognizing unit 11b2. The character recognizing unit 11b2 includes a character clipping unit 11b21, a spline-vector converting unit 11b22, and an optical character reading (OCR) unit 11b23.

The character recognizing unit 11b2 performs character recognition with respect to a document component which data attribute is analyzed as text data by the attribute analyzing unit 11b, and converts a text element into a machine-processable format.

The character clipping unit 11b21 clips out characters by detecting a color density difference. The character clipping unit 11b21 precisely clips out characters, and thereby making it possible to perform a character analysis precisely.

The spline-vector converting unit 11b22 applies a linear spline function to the clipped characters. By application of the linear spline function, the outline of the clipped characters can be smoothed.

The OCR unit 11b23 performs optical character recognition with respect to the characters to which the linear spline function has been applied by the spline-vector converting unit 11b22. In other words, the OCR unit 11b23 extracts text data from character images.

In this manner, the character recognizing unit 11b2 converts the character images into text data that is in machine-processable format. The keyword extracting unit 12 extracts a keyword from this text data whereby the keyword can be extracted precisely and quickly. Incidentally, the character recognition can be performed by using any available algorithm.

As shown in FIG. 1, the operation display unit 15 includes an operating unit 15a that receives an input, such as data or commands, from a user and a monitor 15b on which information input by the user and a result of retrieval are displayed.

The display control unit 14 controls what, where, and how to display contents on the monitor 15b. For example, the display control unit 14 controls display of the document data, which is split into subareas by each data attribute by the area splitting unit 11, on the monitor 15b. The area splitting unit 11 can be configured to split the document data into subareas by attributes set by the user via the operating unit 15a. When the user finds out that a displayed image that is analyzed as a text image by the area splitting unit 11 is actually a picture image after looking at the displayed image, the user can change the data attribute of the displayed image from text data to picture image data by operating the operation display unit 15. Upon receiving instructions for changing the data attribute from the user, the area splitting unit 11 changes the data attribute of the displayed image to picture image data.

Sometimes the user may notice a readout error of a character. Upon noticing a readout error, the user inputs an instruction to correct the readout error. Upon receiving such an instruction, the character recognizing unit 11b2 corrects the text data based on the instruction. In this manner, the user can change a data attribute of the document component as the subarea, and correct a readout error of a character.

Figure 5:
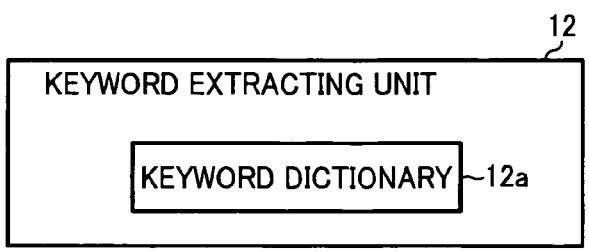
FIG. 5 is a block diagram of a keyword extracting unit shown in FIG. 1.

FIG. 5 is a block diagram of the keyword extracting unit 12. The keyword extracting unit 12 includes a keyword dictionary 12a. Words that function as keywords are stored in the keyword dictionary 12a.

The keyword extracting unit 12 splits character strings included in a text subarea by each morpheme by the application of a morphological analysis. The keyword extracting unit 12 determines whether each of the character strings by each morpheme matches with any of the keywords stored in the keyword dictionary 12a. If the character string matches with the keyword, the keyword extracting unit 12 extracts the matching character string as a candidate keyword. The keyword extracting unit 12 can be configured to narrow down candidate keywords by the application of an algorithm based on conditions such as the layout obtained by the layout analysis and a frequency of appearance, and thereby determining a keyword.

The retrieving unit 13 transmits the keyword extracted by the keyword extracting unit 12 and a search command based on the keyword to the database device 5 on the Web connected to the network 4 via the input/output unit 16.

Upon receiving the keyword and the search command, the database device 5 searches information based on the keyword, and transmits the information retrieved in the search in the form of a Hypertext Markup Language (HTML) to the document retrieval device 10 via the network 4. The document retrieval device 10 receives the information via the input/output unit 16.

Upon receiving the information in the form of the HTML file, the display control unit 14 displays the received information on the monitor 15b. The display control unit 14 displays the information on the monitor 15b with a Web browser viewer, so that the user can view the information on the monitor 15b with the browser as if it were a web search with a personal computer (PC).

Figure 6:
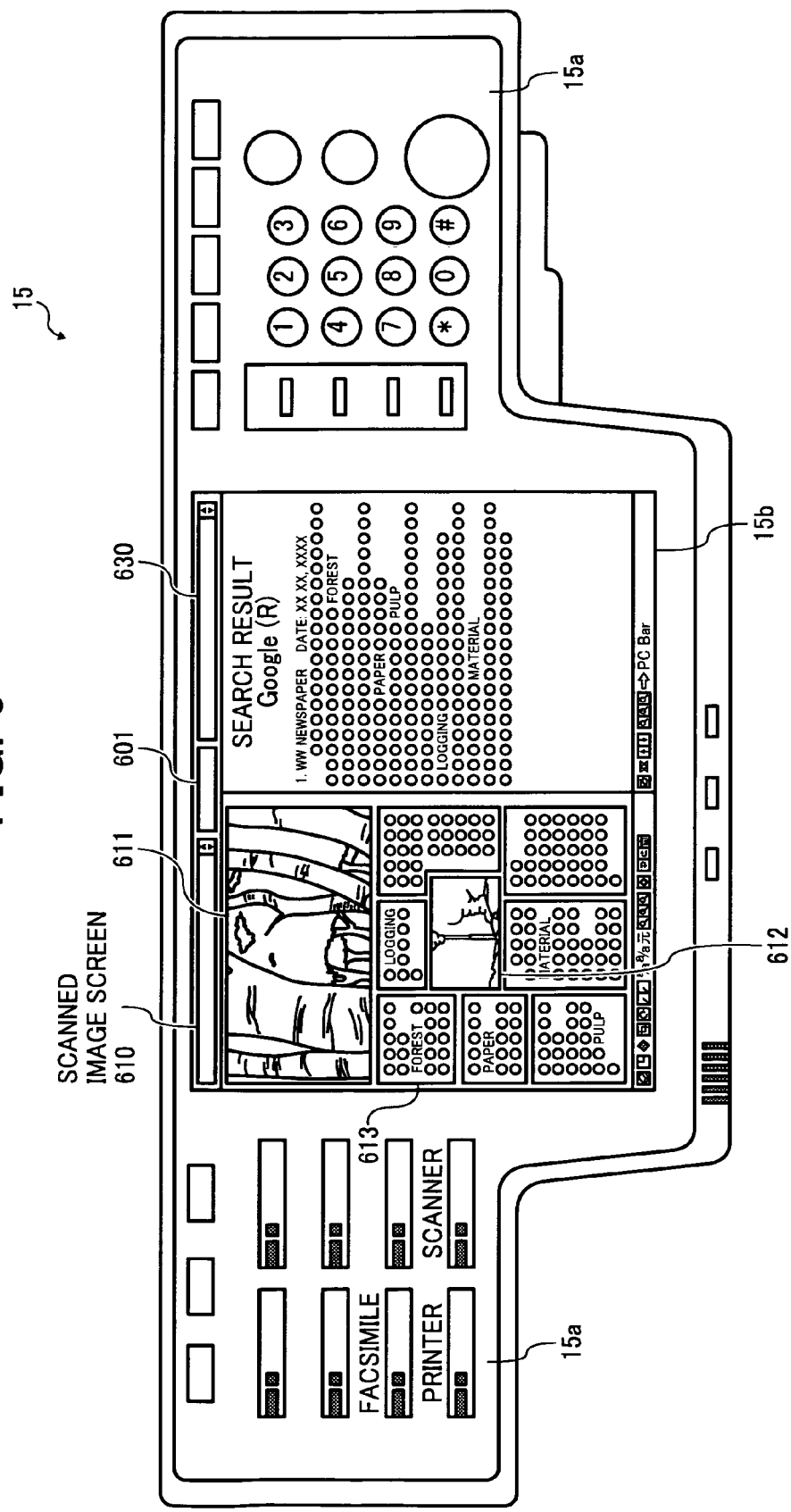
FIG. 6 is a schematic diagram of an operation display unit shown in FIG. 1.

FIG. 6 is a schematic diagram of the operation display unit 15. The user can input an instruction to the operating unit 15a by pushing or touching a push button or a numeric keypad. The monitor 15b displays thereon an image scanned by the scanner 1, setting items, and a result of retrieval. The monitor 15b receives a touch input for setting or a drag-and-drop operation by a user's finger.

As shown in FIG. 6, two different images are displayed side-by-side, one on the left and the other on the right side, on the monitor 15b. A document image scanned by the scanner 1 is displayed on a screen 610 in the left side of an entire display screen 601. Information received from the database device 5 is displayed on a screen 630 in the right side of the entire display screen 601.

On the screen 610, the document image is split into subareas by each data attribute by the area splitting unit 11, and displayed on the monitor 15b by the display control unit 14. For example, subareas 611 and 612 include a picture image, and a subarea 613 includes text data.

The keyword extracting unit 12 extracts a keyword from each of the subareas that includes text data, and the retrieving unit 13 causes the database device 5 to search information relevant to the extracted keyword. In the example shown in FIG. 6, "forest", "paper", "pulp", and "material" are extracted as keywords from text data subareas on the screen 610.

Figure 7:
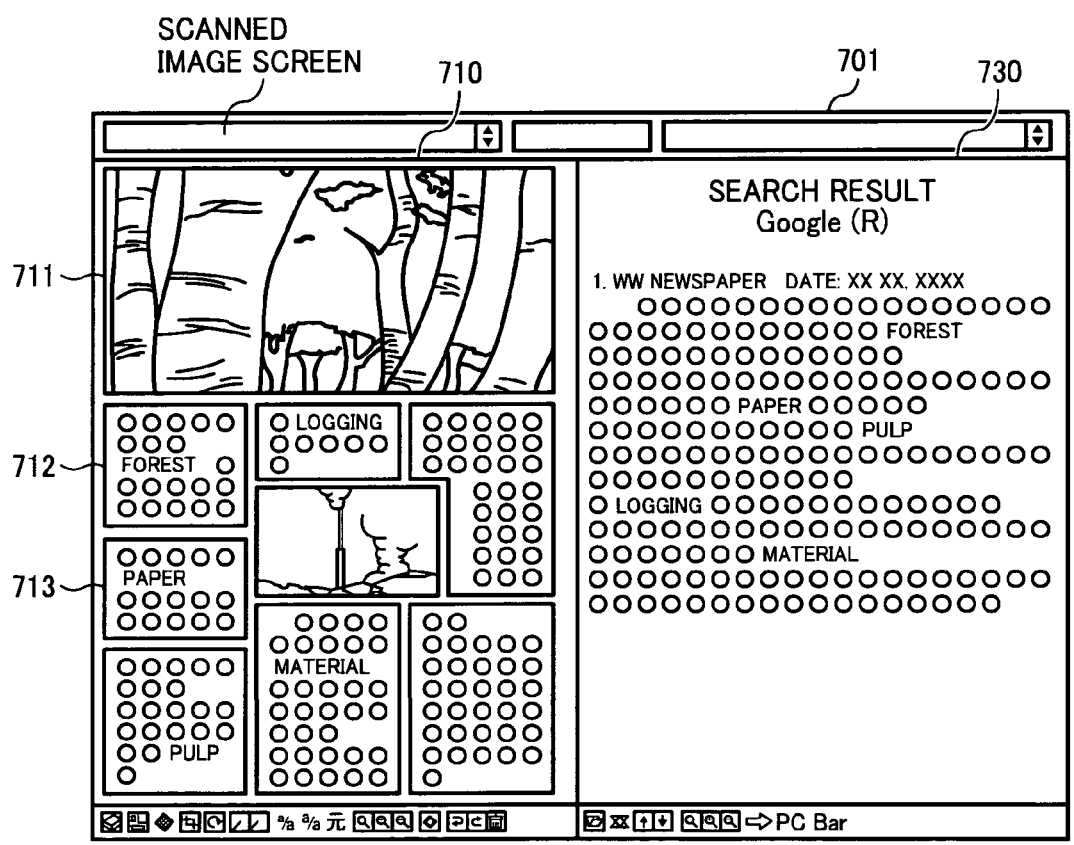
FIG. 7 is a schematic diagram of an example of a monitor of the operation display unit shown in FIG. 6.

FIG. 7 is an enlarged view of the contents displayed on the monitor 15b. An image scanned by the scanner 1 is displayed on a screen 710 in the left side of an entire display screen 701 of the monitor 15b. The image on the screen 710 is split into subareas by each data attribute by the area splitting unit 11. For example, a subarea 711 includes a picture image, and a subarea 712 includes text data.

As shown in FIG. 7, the display control unit 14 controls to display the image on the screen 710 in such a manner that each subarea is surrounded by a frame. Alternatively, the display control unit 14 can control to display the image on the screen 710 in such a manner that each subarea is blinked or shadowed. As long as each of the subarea is clearly-differentiated, any display method can be employed.

In addition, it is preferable that the display control unit 14 controls to display the image in which each keyword extracted by the keyword extracting unit 12 is highlighted by surrounding with a frame, blinked, or shadowed so that the user can easily recognize the extracted keywords.

The document retrieval device 10 can be configured in such a manner that the retrieving unit 13 starts retrieving upon completion of scanning a document by the scanner 1. The document retrieval device 10 can be configured to select whether to display a scanned image or not. In most cases, the user holds an original document subjected to be scanned, so that it is eye-friendly for the user if the scanned image is hidden and retrieved information is mainly displayed.

Retrieved information is displayed on a screen 730 in the right side of the entire display screen 701. When the image is just scanned by the scanner 1, any information is not retrieved yet, so that no image is displayed on the screen 730, i.e., there is just indicated it is a retrieval screen.

As for an operational input to start retrieving, the user touches a specific text subarea, for example, the subarea 712 with his finger, and drags and drops the subarea 712 into the screen 730, so that it starts retrieving information relevant to a keyword of the subarea 712.

Even if a plurality of text subareas, for example, the subareas 712 and 713 are selected, in the same manner as explained above, the subareas 712 and 713 are dragged and dropped into the screen 730, so that it starts retrieving information relevant to keywords of the subareas 712 and 713. In this manner, the selection of the subarea and the extraction of the keyword can be performed successively, so that it is possible to improve an operating efficiency.

The operation display unit 15 receives a specification to select a subarea subjected to be retrieved from the subareas displayed on the monitor 15b and an instruction to release the specification of the selected subarea. It is preferable that the display control unit 14 displays the selected subarea in a manner different from other subareas. In this manner, the user can select a subarea to be specified, and a keyword is extracted from the selected subarea. Therefore, it is possible to improve a retrieval performance precisely because keywords are narrowed down by selecting a subarea.

In this case, it is preferable that the operation display unit 15 receives an operational instruction by a touch input with a human finger or a stylus pen, or an input with a mouse.

If no subarea is specified, the keyword extracting unit 12 extracts keywords from whole scanned document data, i.e., all the text subareas. In this case, information relevant to the whole scanned document data is automatically retrieved.

When the retrieving unit 13 receives information searched by the database device 5 based on the keyword, the display control unit 14 displays the retrieved information on the screen 730 with a browser.

Figure 8:
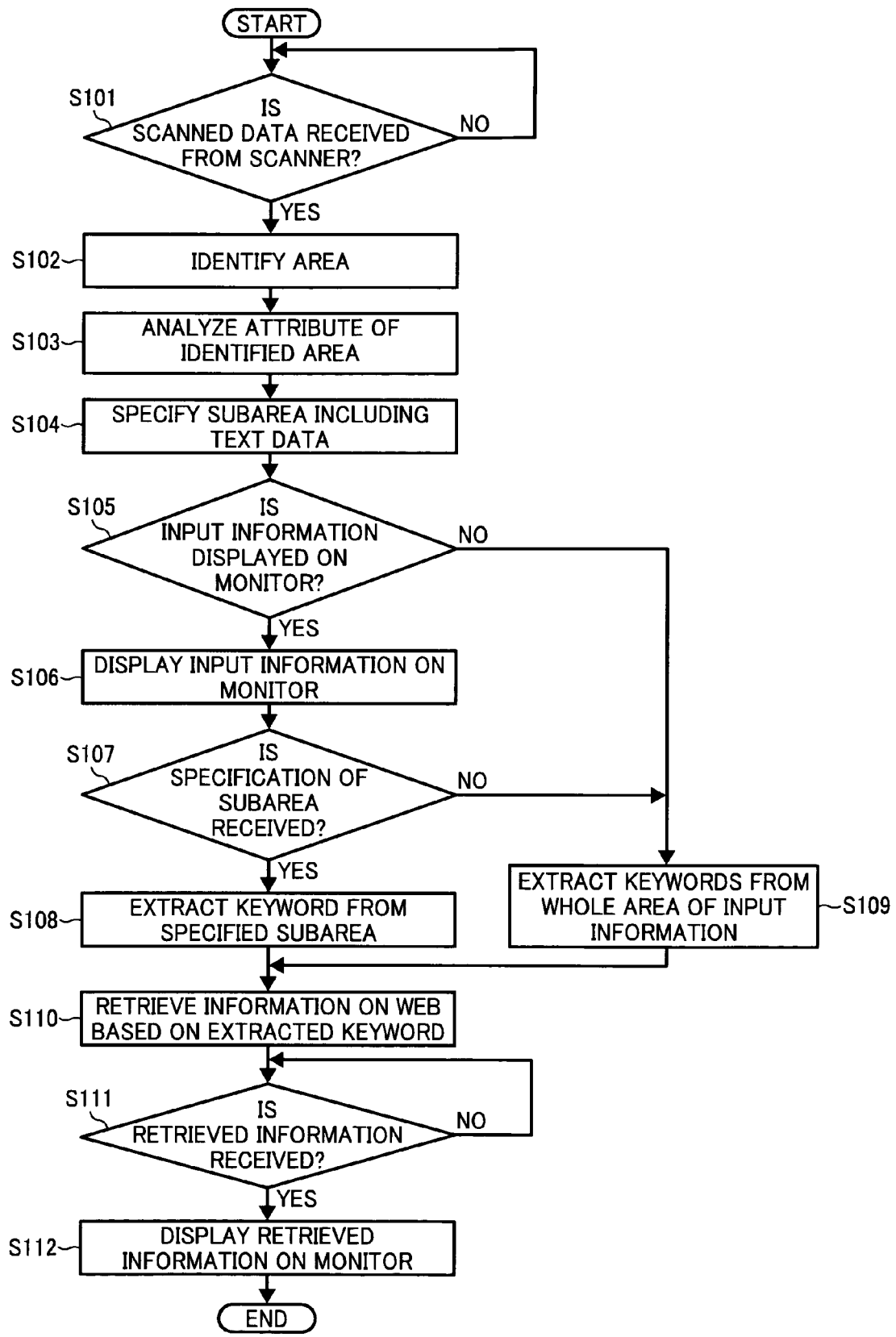
FIG. 8 is a flowchart for explaining a document retrieval process performed by the document retrieval device according to the first embodiment.

FIG. 8 is a flowchart for explaining a document retrieval process performed by the document retrieval device 10. The input/output unit 16 detects whether the input/output unit 16 has received scanned data from the scanner 1 (step S101). Upon receiving scanned data from the scanner 1 (YES at step S101), the input/output unit 16 outputs the received data to the area splitting unit 11.

The area splitting unit 11 identifies an area of the scanned data such as a bitmapped image (step S102). The area splitting unit 11 analyzes a data attribute of data included in the identified area. Namely, the area splitting unit 11 analyzes the data included in the identified area is any of a text, a picture image, a chart, or others, such as a combination of a text, a picture image, and a chart to split the data into subareas by each data attribute (step S103).

Especially, the area splitting unit 11 specifies any subarea including text data to extract a keyword (step S104).

The display control unit 14 determines whether the input information is set to be displayed on the monitor 15b (step S105). If the input information is set not to be displayed on the monitor 15b (NO at step S105), the display control unit 14 does not display the input information on the monitor 15b, and the keyword extracting unit 12 extracts keywords from whole area of the input information (step S109).

On the other hand, if the input information is set to be displayed on the monitor 15b (YES at step S105), the display control unit 14 displays the input information on the monitor 15b (step S106), for example, on the screen 710 shown in FIG. 7.

The operation display unit 15 detects whether the operation display unit 15 receives any specification of a subarea (step S107). If it is detected that the operation display unit 15 does not receive any specification of a subarea (NO at step S107), the keyword extracting unit 12 extracts keywords from all the input information (step S109).

On the other hand, if it is detected that the operation display unit 15 receives a specification of a subarea (YES at step S107), the keyword extracting unit 12 extracts a keyword from the specified subarea (step S108). At this time, the user can specify the subarea by touching the subarea with his finger, and drag and drop the subarea into a retrieval screen to start retrieving.

The retrieving unit 13 retrieves information relevant to the extracted keyword on the Web. Specifically, the retrieving unit 13 transmits the extracted keyword and a search command to the database device 5, and causes the database device 5 to search information relevant to the extracted keyword. Upon receiving the extracted keyword and the search command, the database device 5 searches information relevant to the extracted keyword, and transmits the searched information to the document retrieval device 10 via the network 4 (step S110).

When the input/output unit 16 receives a result of the Web search from the database device 5 (YES at step Sill), the display control unit 14 displays the received information as the search result on a retrieval screen of the monitor 15b, for example, on the screen 730 shown in FIG. 7 (step S112).

In this manner, with single application software, the document retrieval device 10 can perform the area splitting of document data scanned by the scanner 1, the analysis of text data, the extraction of a keyword, the Web search of the data, and the display of a result of retrieval.

The document data scanned by the scanner 1 and retrieved information are displayed side-by-side on the monitor 15b of the operation display unit 15. Such a display makes it easier for the user to compare the original document data with retrieved information that is automatically searched on the Web based on the document.

When the retrieving unit 13 newly performs information retrieval, it is preferable that the display control unit 14 updates to display newly-retrieved information on the retrieval screen.

It is also possible to not display the document image on the monitor 15b. In other words, if the user wants to view only the retrieved information, the scanned data screen is not displayed, so that the user can view the retrieved information with full screen.

In this manner, the image forming apparatus including the document retrieval device 10 can easily retrieve information relevant to content of the scanned document from database devices on the network by just scanning a document without any cumbersome keyboard operation. Furthermore, the image forming apparatus including the document retrieval device 10 can retrieve information relevant to content of the scanned document in the form of an electronic medium from network devices with a simple operation.

As described above, according to the first embodiment, input information is split into a plurality of subareas by each data attribute, and a retrieval key is extracted in a unit of each of the subareas composing the input information. The subareas are displayed on a screen in the left side (a first screen), and any of the subareas on the first screen is moved to a retrieval screen in the right side (a second screen) by a user. A document is retrieved via a network based on the retrieval key of the subarea moved to the retrieval screen, and the retrieved document is displayed on the second screen. Therefore, the user can easily retrieve the document, and reuse the displayed retrieved document.

Figure 9:
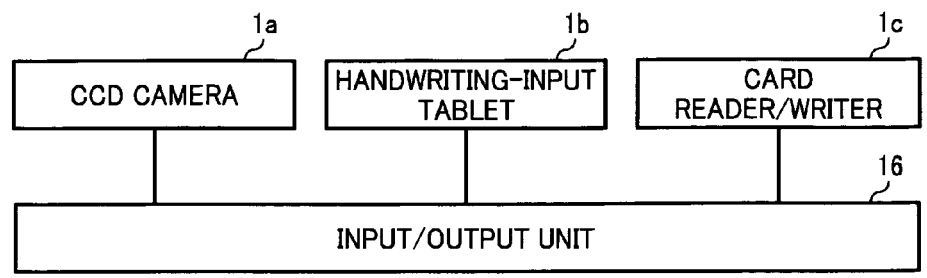
FIG. 9 is a block diagram of other input devices that are connected to an input/output unit included in the document retrieval device shown in FIG. 1.

FIG. 9 is a block diagram for explaining various input devices that are connected to the input/output unit 16. A charge coupled device (CCD) camera 1a is connected to the input/output unit 16, so that the input/output unit 16 can receive a picture image of a subject from the CCD camera 1a. When the input/output unit 16 receives a picture image shot by the CCD camera 1a, the area splitting unit 11 splits the picture image into subareas. Information relevant to a keyword extracted from each picture image subarea can be retrieved from the network.

A handwriting-input tablet 1b is connected to the input/output unit 16, so that the input/output unit 16 can receive a text handwritten by the user with the handwriting-input tablet 1b as text data. When the input/output unit 16 receives handwritten text data input with the handwriting-input tablet 1b, the area splitting unit 11 splits the handwritten text data into text subareas. A keyword is extracted from each text subarea that is recognized as a text by the application of the OCR. Information relevant to the extracted keyword can be retrieved from the network. Moreover, it is possible to input a keyword or revise the text data with the handwriting-input tablet 1b.

A card reader/writer 1c is connected to the input/output unit 16. The card reader/writer 1c reads out data or writes on data stored in a recording medium, such as a compact disc (CD), a digital versatile disc (DVD), a compact flash (CF) card, and a secure digital (SD) memory card. When the input/output unit 16 receives data stored in the recording medium, which is read out by the card reader/writer 1c, the area splitting unit 11 splits the data into subareas. Information relevant to a keyword extracted from each subarea can be retrieved from the network.

The first embodiment relates to receiving information from the input devices. The same or similar technique can be applied when outputting information to the input devices. Namely, the input/output unit 16 can be configured to write data on the recording medium, such as a CD, a DVD, a CF card, and an SD memory card, with the help of the card reader/writer 1c.

Alternatively, the input/output unit 16 can be configured to receive information via the network 4, and transmit the retrieved information via the network 4. Moreover, the input/output unit 16 can be configured to output retrieved information via the image output unit 3 to print out the retrieved information on a recording paper.

It is preferable that the keyword dictionary 12a counts the hit count by each keyword stored therein so that the keywords can be stored with being associated with the hit count. Consequently, the keywords can be arranged in the order of use frequency, and thus a keyword can be extracted more immediately.

It is preferable that keywords are stored in the keyword dictionary 12a in such a manner that the keywords are classified by each category, so that information retrieval based on a keyword can be performed at high speed.

Each time the keyword extracting unit 12 performs the keyword extraction, a character string that meets a predetermined hit count and a predetermined grammatical condition is preferably registered in the keyword dictionary 12a. This is because a new keyword appears with time or with an increase of kinds of documents subjected to be retrieved, and also a frequency of appearance of the keyword changes with time.

Furthermore, it is preferable that the keyword extracting unit 12 extracts a word which frequency of appearance exceeds a threshold from each text subarea as a keyword. If a word has a low frequency of appearance, it is highly possible that the word does not function as a keyword.

The operation display unit 15 can be configured to receive an input for setting the number of keywords to be extracted. By controlling the number of keywords, the scope of the retrieval can be narrowed down or broadened.

If the set number of keywords is larger than the number of words included in text subareas, it is preferable that the keyword extracting unit 12 extracts all the words as a keyword. For example, if the document mostly includes photos and charts, it may be only a headline that text data included in the document is. In this case, all the detected words are to be selected as a keyword.

Figure 10:
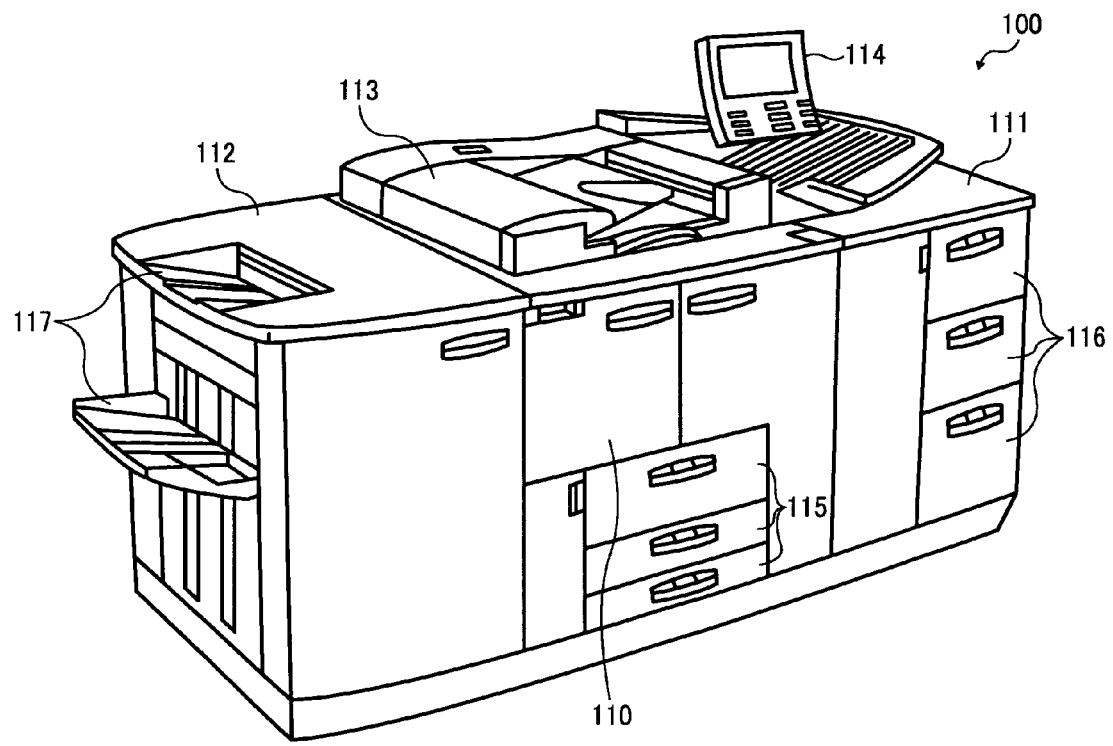
FIG. 10 is an external perspective view of the image forming apparatus including the document retrieval device according to the first embodiment.

FIG. 10 is an external perspective view of the image forming apparatus including the document retrieval device 10. An image forming operation performed by the image forming apparatus is explained below with respect to FIG. 10. The image forming operation is a well known technology, so that the image forming operation is simply explained below.

It is assumed that the image forming apparatus is a digital copier 100. The digital copier 100 includes a package 110, a large capacity tray (LCT) 111, a finisher 112, an auto document feeder (ADF) 113, an operating unit 114, and a paper feeding unit 115. The LCT 111 holds a large capacity of recording paper therein. The finisher 112 sorts, hole-punches, or staples copied recording paper. The ADF 113 and the operating unit 114 are mounted on top of the package 110. A document to be scanned is put on the ADF 113. The operating unit 114 receives a setting instruction from a user, such as settings for a scanning mode, a copy zoom ratio, a tray, and a post-process to be performed by the finisher 112, and also displays thereon a message to the user. The operating unit 114 can function as the operation display unit 15.

The paper feeding unit 115 is arranged in a lower portion of the package 110. The finisher 112 includes a paper discharging tray 117. The digital copier 100 contains mechanisms, such as an exposure optical system, a paper feed system, a development system, a fixing system, and a paper discharge system, and thereby realizing an operation of a copier.

When a document is put on the ADF 113, and a "COPY START" key of the operating unit 114 is pressed by the user, the document is fed onto an exposure glass (not shown) under the ADF 113, and scanned by an illumination system (not shown) and an imaging optical system (not shown). In a case of the normal image forming operation, various processes, such as a correction, are applied to the scanned image data, and a laser diode in a write system emits beams based on the image data, and thereby forming an electrostatic latent image on a photoreceptor (not shown).

In the digital copier 100 including the document retrieval device 10, the area splitting unit 11, the keyword extracting unit 12, the retrieving unit 13, and the display control unit 14 respectively perform each process as explained above with respect to the scanned image data, and retrieved information is displayed on the monitor 15b.

Subsequently, an electrophotographic process is performed. Based on an instruction from the user to be input to the operating unit 114, the scanned image data or the retrieved information is printed out on recording paper, which is fed by the paper feeding unit 115 or a paper feeding unit 116, and a post-process, such as sorting, hole-punching, or stapling, is applied to the printed paper by the finisher 112, and then discharged onto the paper discharging tray 117.

Figure 11:
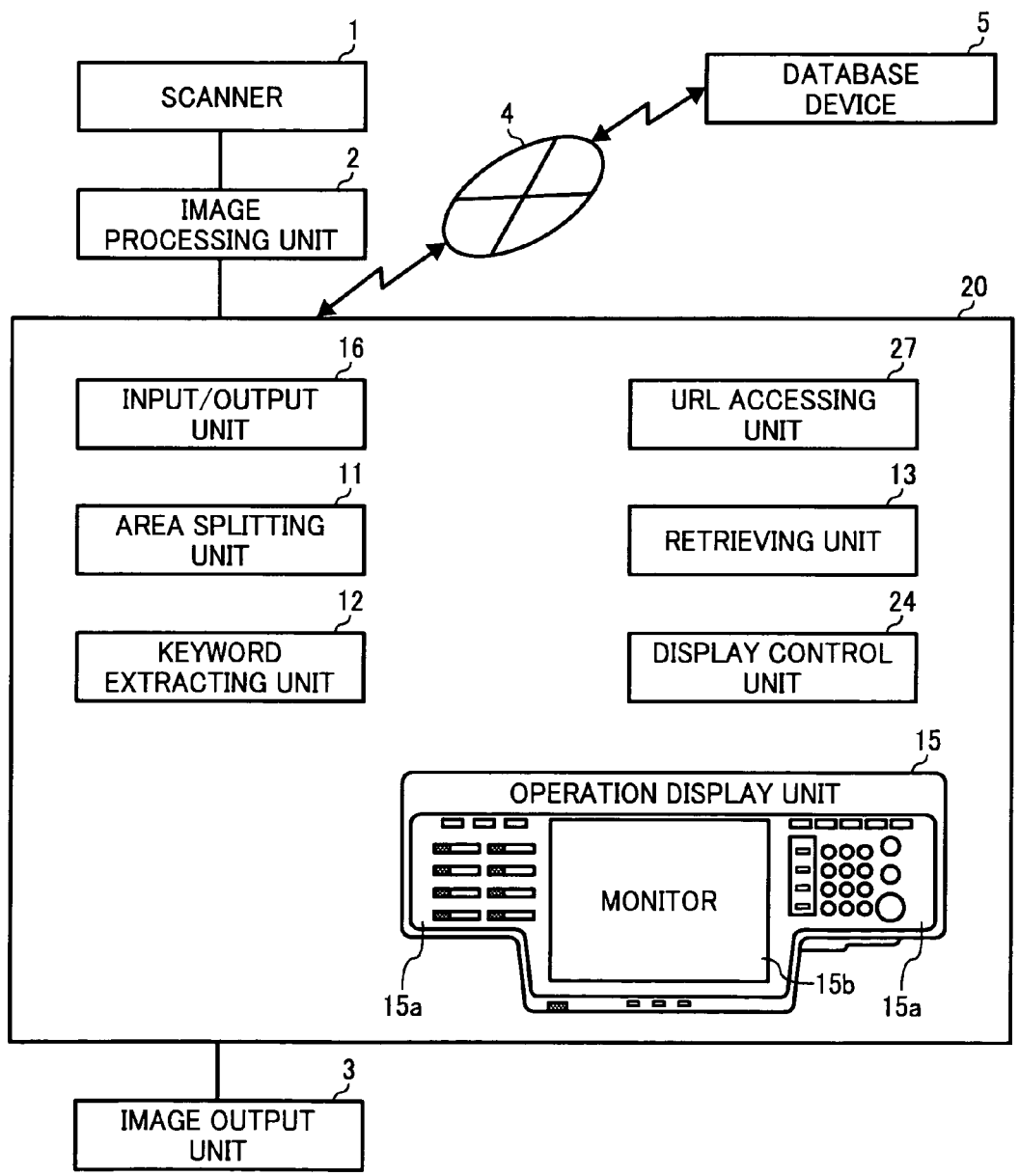
FIG. 11 is a block diagram of an image forming apparatus including a document retrieval device according to a second embodiment of the present invention.

FIG. 11 is a block diagram of an image forming apparatus including a document retrieval device 20 according to a second embodiment of the present invention. The difference between the document retrieval device 20 and the document retrieval device 10 is that the document retrieval device 20 includes a display control unit 24 instead of the display control unit 14, and further includes a uniform resource locator (URL) accessing unit 27. The portions shown in FIG. 11 that are identical to those shown in FIG. 1 are denoted with the same reference numerals, and the description of those portions is omitted. The URL accessing unit 27 extracts an URL from retrieved information obtained by the retrieving unit 13, and accesses the extracted URL to download information available to a site having the URL. The display control unit 24 displays the information downloaded by the URL accessing unit 27 on the monitor 15b with a browser.

Figure 12:
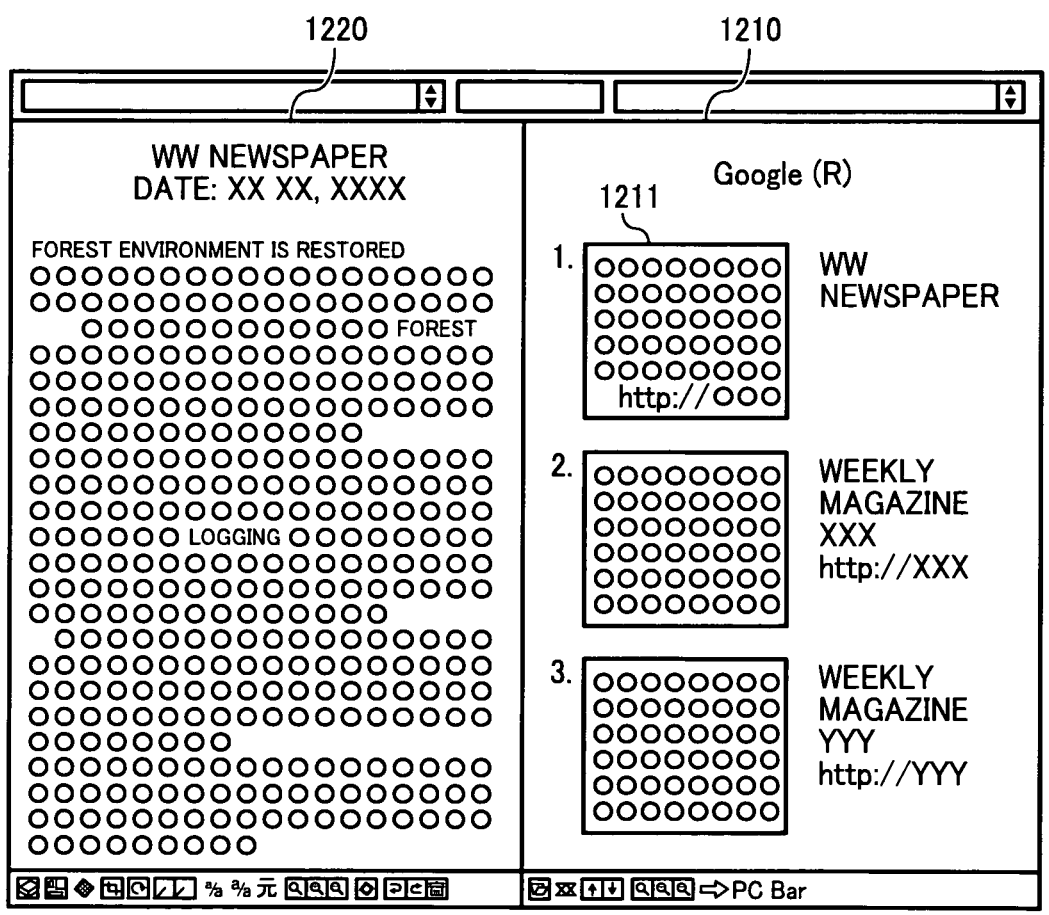
FIG. 12 is a schematic diagram for explaining the contents displayed on a monitor shown in FIG. 11.

FIG. 12 is an enlarged view of the contents displayed on the monitor 15b shown in FIG. 11. Specifically, downloaded information obtained by clicking on a URL displayed on a retrieval screen is displayed on the monitor 15b. Most of the information retrieved from Web sites based on an extracted keyword includes a URL. The retrieved information is displayed on a screen 1210 in the right side of the monitor 15b. For example, when a user double-clicks on a URL 1211 displayed on the screen 1210, the monitor 15b accepts an operational input for the URL 1211. The URL accessing unit 27 accesses the URL received via the input/output unit 16 to download information uploaded to a site having the URL 1211, and the display control unit 24 displays the downloaded information on a screen 1220 in the left side of the monitor 15b with a browser.

As for other URLs displayed on a margin of retrieved information, in the same manner as in the case of the URL 1211, when the user double-clicks on the URL, information uploaded to a site having the URL is downloaded to be displayed on the screen 1220.

In this manner, the URL accessing unit 27 retrieves information available to a site having a URL included in retrieved information via the network 4, and thus it is possible to retrieve more detailed information.

Figure 13:
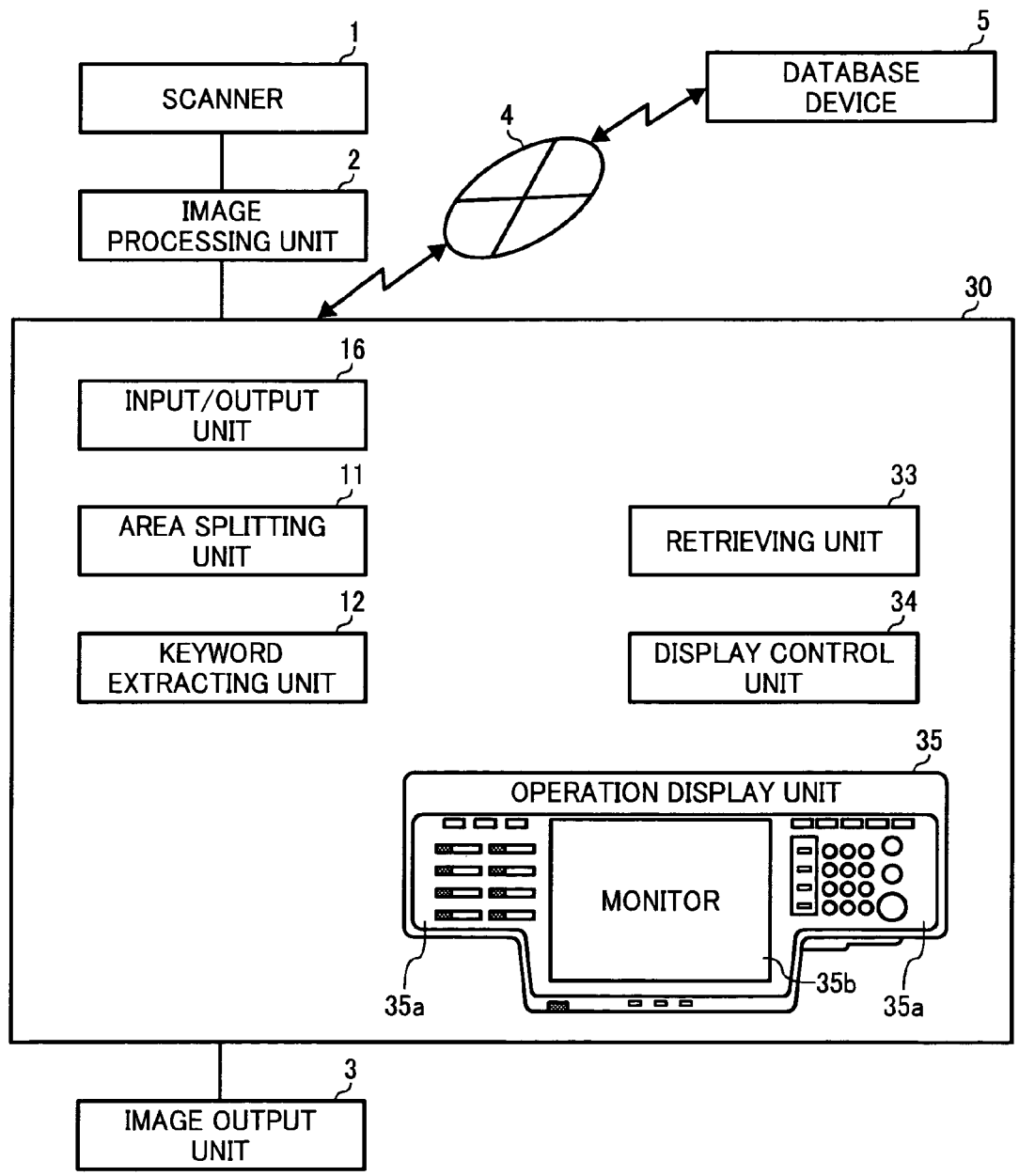
FIG. 13 is a block diagram of an image forming apparatus including a document retrieval device according to a third embodiment of the present invention.

FIG. 13 is a block diagram of an image forming apparatus including a document retrieval device 30 according to a third embodiment of the present invention. The difference between the document retrieval device 30 and the document retrieval device 10 is that the document retrieval device 30 includes a retrieving unit 33, a display control unit 34, and an operation display unit 35 instead of the retrieving unit 13, the display control unit 14, and the operation display unit 15 respectively. The portions shown in FIG. 13 that are identical to those shown in FIG. 1 are denoted with the same reference numerals, and the description of those portions is omitted. The operation display unit 35 includes an operating unit 35a and a monitor 35b. The operating unit 35a receives an operational input for specifying a combination of a plurality of keywords from a user. The retrieving unit 33 creates a search command to cause the database device 5 to search information relevant to the received combination of keywords, and transmits the created search command in association with the keywords to the database device 5. Therefore, a user can set the scope of the retrieval if needed, i.e., can set to be broadened, be narrowed down, or limit within the broadened scope, and thus it is possible to retrieve information depending on the user's setting.

The operating unit 35a receives an operational input for specifying any of an AND search, an OR search, or a combination of the AND search and the OR search with respect to the displayed keywords. The retrieving unit 33 creates a search command to specify the scope of search, so that it is possible to retrieve information more precisely.

Alternatively, the operating unit 35a can be configured to receive operational inputs for specifying a plurality of subareas and also for specifying a combination of the specified subareas. For example, if the AND search is applied to the text subareas 712 and 713 shown in FIG. 7, the retrieving unit 33 executes information retrieval based on a common keyword extracted from both the character image areas 712 and 713. On the other hand, if the OR search is applied to the text subareas 712 and 713, the retrieving unit 33 executes information retrieval based on any of the keywords extracted from the text subareas 712 and 713. In this manner, information can be retrieved based on a combination of keywords extracted from a combination of subareas, so that the keywords can be narrowed down in units of the subareas or the scope of the information retrieval can be broadened. Therefore, the information can be retrieved with narrowing down the keywords flexibly.

When a combination of subareas is set up, the retrieving unit 33 executes information retrieval by issuing a search command based on a combination of keywords extracted from the combination of the subareas. At this time, the user needs not set up the keywords. The user just specifies the combination of the subareas only. Therefore, the user can reduce the times of operational inputs.

The operation display unit 35 can be configured to receive an input for selecting a key phrase. In some cases, a key phrase itself is a fundamental keyword. Therefore, when the operation display unit 35 is configured to receive an input for specifying a key phrase, information can be retrieved more precisely. In this case, the retrieving unit 13 executes information retrieval based on the key phrase. As an example of a method of the information retrieval with the key phrase, the order of a plurality of keywords is determined, and information is retrieved in such a manner that the AND search is applied to the ordered keywords.

When a text subarea located near a picture image subarea is specified via the monitor 15b, a keyword is extracted from the specified text subarea, and information is retrieved based on the keyword in association with the picture image. Therefore, it is possible to retrieve information relevant to the keyword in association with the picture image.

For example, when the user drags with his finger a plurality of subareas to be passed through the picture image subarea 711 shown in FIG. 7 and drops the subareas into the retrieval screen 730, keywords relevant to the picture image subarea 711 are extracted from the text subareas, and information is retrieved based on the keywords.

In this example, the picture image of the picture image subarea 711 can be displayed side-by side to the retrieved information associated with the picture image on the retrieval screen 730, so that it is possible to display the retrieved information and the picture image in associated manner.

Figure 14:
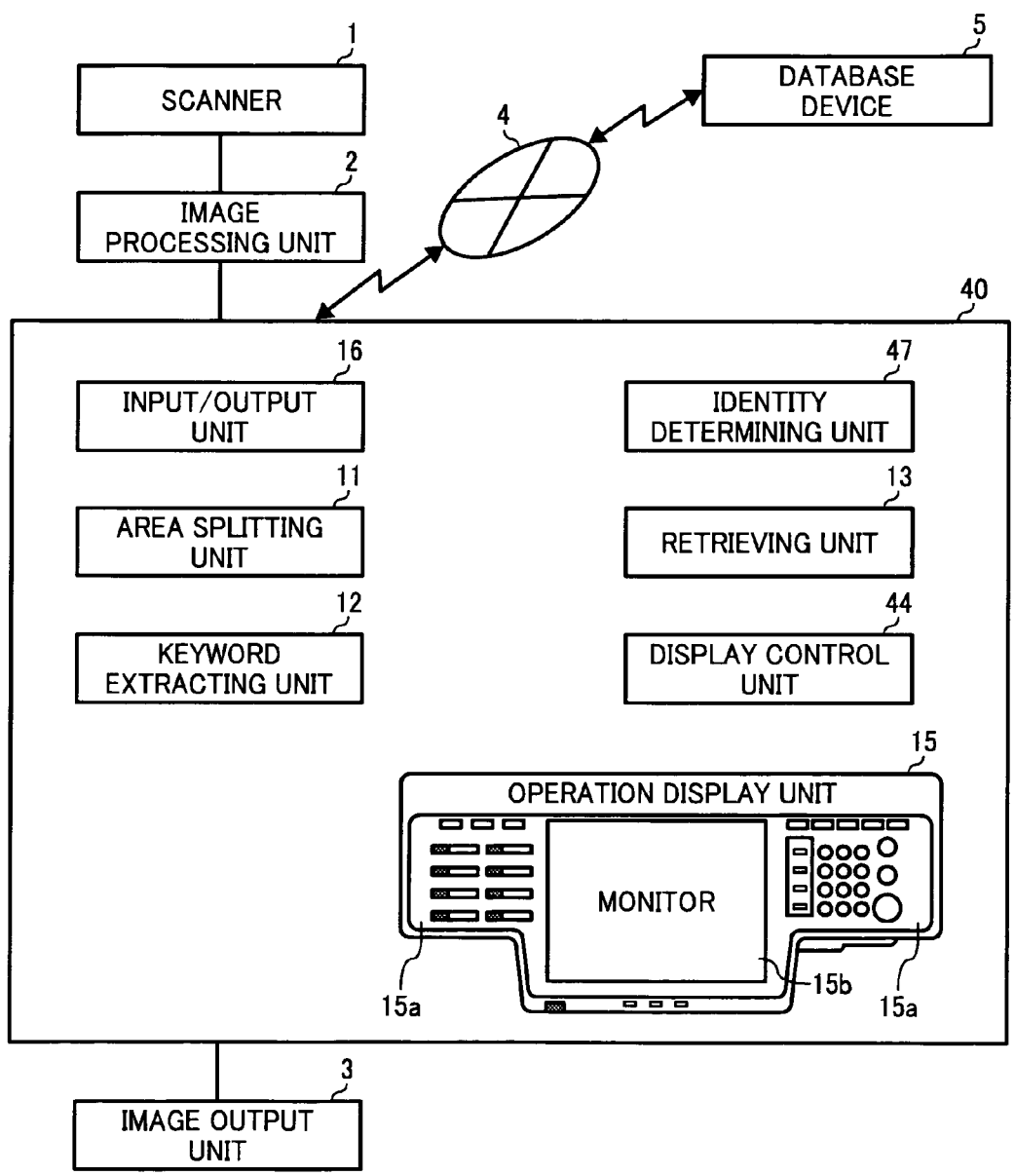
FIG. 14 is a block diagram of an image forming apparatus including a document retrieval device according to a fourth embodiment of the present invention.

FIG. 14 is a block diagram of an image forming apparatus including a document retrieval device 40 according to a fourth embodiment of the present invention. The difference between the document retrieval device 40 and the document retrieval device 10 is that the document retrieval device 40 includes a display control unit 44 instead of the display control unit 14, and additionally includes an identity determining unit 47. The portions shown in FIG. 13 that are identical to those in FIG. 1 are denoted with the same reference numerals, and the description of those portions is omitted. The identity determining unit 47 determines whether image data scanned by the scanner 1 is identical to retrieved information received from the database device 5. If the image data is identical to the retrieved information, the display control unit 44 displays on the monitor 15b the retrieved information that is identical to the image data in a display format different from the retrieved information that is not identical to the image data.

The identity determining unit 47 compares the predetermined number of character strings in the scanned image data with retrieved character strings in HTML format. By comparing character codes of the scanned image data and the retrieved information, it can be easily determined whether content of the scanned image data matches with content of the retrieved information. Specifically, it can be determined whether the scanned image data matches with the retrieved information in such a manner that the predetermined number of character strings around the extracted keyword in the scanned image data is compared with the retrieved information relevant to the keyword.

For example, when electronic data corresponding to a newspaper article scanned by the scanner 1 is retrieved from electronic data on the Web, the retrieved electronic data is displayed on the monitor 15b. In other words, when electronic data having the same content as that is of the scanned newspaper article is retrieved from electronic data on the Web, the retrieved electronic data is displayed on the monitor 15b, and thus analog information can be practically converted into digital information.

In a variation of the document retrieval device 40 according to the fourth embodiment, the database device 5 determines whether retrieved information matches with a received document data including a keyword, and transmits the retrieved information to the document retrieval device 40 if the retrieved information matches with the document data. The display control unit 44 can be configured to control to display the retrieved information together with information indicating that the retrieved information matches with the scanned document data on the monitor 15b. Incidentally, when such a configuration is employed, it is not necessary to provide the identity determining unit 47 in the document retrieval device 40.

According to the variation of the fourth embodiment, the retrieving unit 13 transmits a keyword together with the predetermined number of character strings around the keyword to the database device 5. Upon receiving the keyword and the character strings, the database device 5 compares the received character strings including the keyword with retrieved information relevant to the keyword, so that the database device 5 can determine whether the retrieved information matches with the document data including the received character strings. If the retrieved information matches with the document data, the database device 5 transmits the retrieved information together with information indicating that the retrieved information matches with the document data.

For example, when electronic data corresponding to a newspaper article scanned by the scanner 1 is retrieved from electronic data on the Web, the retrieved electronic data is displayed on the monitor 15b. In other words, electronic data having the same content as that is of the scanned newspaper article is retrieved from electronic data on the Web. In this case, the document retrieval device 40 can exclude the identity determining unit 47.

A document retrieval device according to a fifth embodiment of the present invention is explained below. The document retrieval device according to the fifth embodiment has the same configuration as that of the document retrieval device 40 shown in FIG. 14. In the document retrieval device according to the fifth embodiment, the display control unit 44 controls to display a plurality of keywords in a form of a toggle button (widget) on a toolbar. A user specifies a keyword by selecting any of the displayed toggle buttons via the operation display unit 15. The retrieving unit 13 executes information retrieval based on the keyword corresponding to the selected toggle button. The toggle buttons are screen elements for specifying a keyword.

Figure 15A:
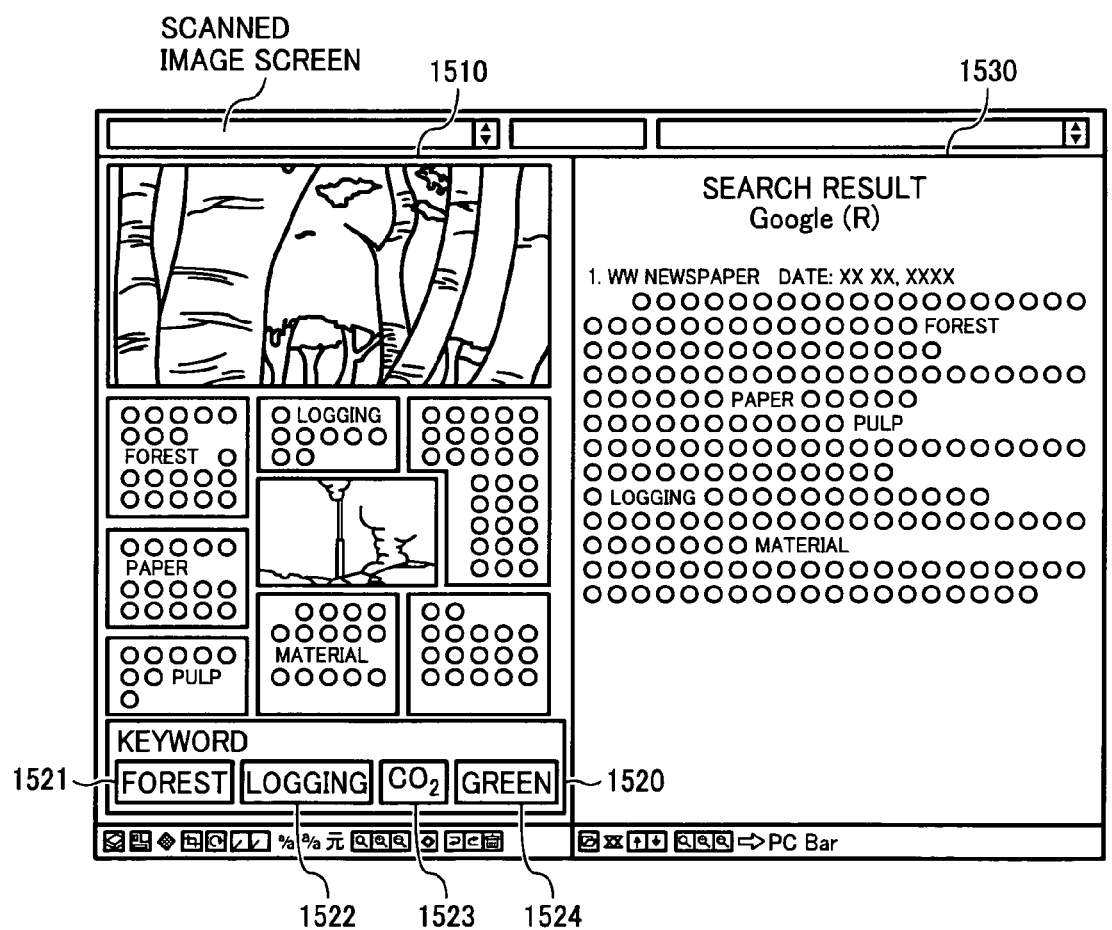
FIG. 15A is a schematic diagram for explaining the contents displayed on a monitor included in a document retrieval device according to a fifth embodiment of the present invention.

FIG. 15A is an enlarged view of the contents displayed on the monitor 15b included in the document retrieval device according to the fifth embodiment. The display control unit 44 displays scanned data split into subareas on a screen 1510 in the left side of the monitor 15b, and also displays keywords 1521 to 1524 extracted from the subareas by the keyword extracting unit 12 in a form of a toggle button on a toolbar 1520 included in the screen 1510. For example, when a user specifies any of the keywords 1521 to 1524 by a touch input, the retrieving unit 13 executes information retrieval based on the specified keyword, and the display control unit 44 displays retrieved information relevant to the keyword on a screen 1530 in the right side of the monitor 15b.

The user can specify a plurality of the keywords by selecting a plurality of toggle buttons, and the AND search or the OR search is applied to the keywords to retrieve information.

Moreover, if the user newly inputs a keyword, a toggle button for specifying the input keyword can be additionally displayed on the toolbar 1520. As a result, the user can input a keyword as desired.

Furthermore, if the handwriting-input tablet 1b is available, once a handwritten word by the user is recognized, the handwritten word can be used as a new keyword.

Figure 15B:
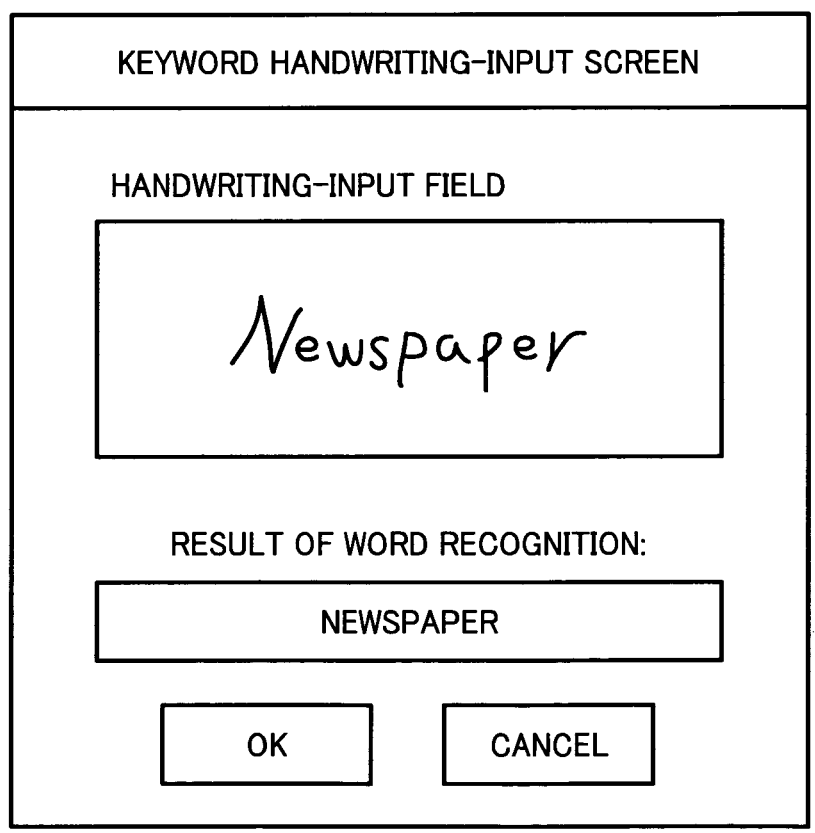
FIG. 15B is a schematic diagram of an example of a keyword handwriting-input screen.

Specifically, when the user presses a certain button for specifying a handwriting input, the display control unit 44 displays a keyword handwriting-input screen as shown in FIG. 15B on the monitor 15b. The user handwrites a word as an additional keyword on a handwriting-input field of the keyword handwriting-input screen with the handwriting-input tablet 1b. The document retrieval device according to the fifth embodiment further includes a handwritten-word recognizing unit, so that the handwritten-word recognizing unit recognizes the word handwritten by the user, and outputs a recognized word to be displayed on a field of a result of the word recognition as the keyword. If the displayed result of the word recognition is correct, the user presses an "OK" button on the keyword handwriting-input screen with the handwriting-input tablet 1b. As a result, a toggle button for the recognized word as the keyword is additionally displayed on the toolbar 1520.

On the other hand, if the displayed result of the word recognition is wrong, the user presses a "CANCEL" button on the keyword handwriting-input screen with the handwriting-input tablet 1b. As a result, the handwritten word displayed on the handwriting-input field is cleared. The user needs to handwrite the word again.

Figure 16:
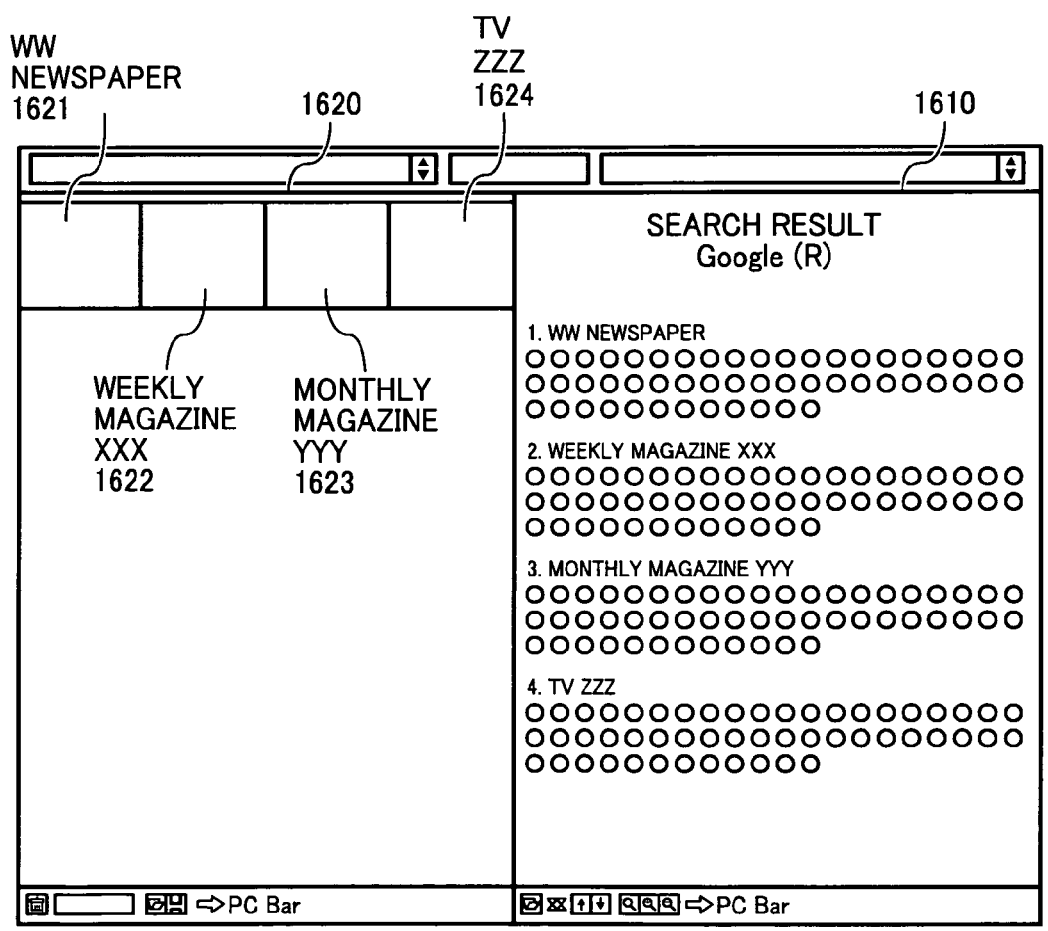
FIG. 16 is a schematic diagram for explaining the contents displayed on a monitor included in a document retrieval device according to a variation of the fifth embodiment.

FIG. 16 is an enlarged view of the contents displayed on the monitor 15b included in the document retrieval device according to a variation of the fifth embodiment. In the variation, the display control unit 44 displays retrieved information in a form of a toggle button on the monitor 15b. When the user clicks on a toggle button, retrieved information corresponding to the toggle button can be displayed on the monitor 15b with full screen.

As shown in FIG. 16, plural pieces of retrieved information are displayed on a screen 1610 in the right side of the monitor 15b. Toggle buttons 1621 to 1624 displayed on top of a screen 1620 in the left side of the monitor 15b respectively correspond to the retrieved information displayed on the screen 1610. For example, when the user clicks on the toggle button 1621, a newspaper article corresponding to the toggle button 1621 is displayed on the screen 1620 under a field of the toggle buttons 1621 to 1624.

The document retrieval device according to the variation of the fifth embodiment displays a list of retrieved information in the form of the toggle button, so that the user can easily confirm the list. Furthermore, retrieved information corresponding to a selected toggle button can be displayed side-by-side to the detailed information of the retrieved information. At this time, a scanned document image or the list of toggle buttons can be apparently disappeared to be hidden from the monitor 15b.

Furthermore, the display control unit 44 can be configured to display URLs of information retrieved by the retrieving unit 13 in a form of a toggle button. When such a configuration is employed, when the user clicks on any of the URLs in the form of the toggle button, the document retrieval device according to the variation of the fifth embodiment can access the URL to download information.

Furthermore, the display control unit 44 can express only retrieved information that the user drags and drops into the left side of the monitor 15b in the form of the toggle button, i.e., only information determined as necessary information by the user can be simply expressed in the form of the toggle button.

Figure 17:
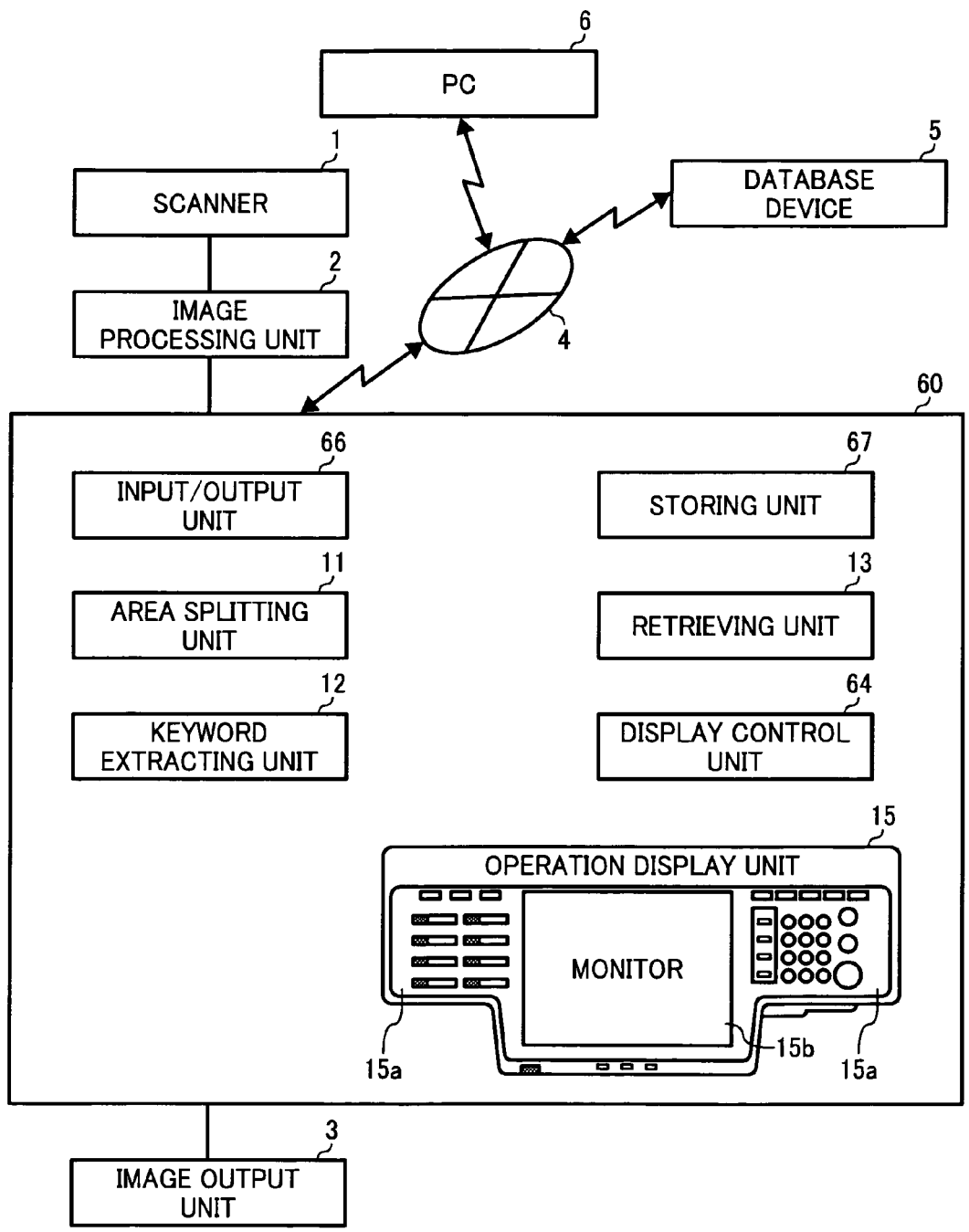
FIG. 17 is a block diagram of an image forming apparatus including a document retrieval device according to a sixth embodiment of the present invention.

FIG. 17 is a block diagram of an image forming apparatus including a document retrieval device 60 according to a sixth embodiment of the present invention. The difference between the document retrieval device 60 and the document retrieval device 10 is that the document retrieval device 60 includes an input/output unit 66 instead of the input/output unit 16 and a display control unit 64 instead of the display control unit 14, and additionally includes a storing unit 67. The portions shown in FIG. 17 that are identical to those in FIG. 1 are denoted with the same reference numerals, and the description of those portions is omitted. The input/output unit 66 transmits a URL included in information retrieved by the retrieving unit 13 to other network-attached information processing devices such as a PC 6. The PC 6 is connected to the document retrieval device 60 via the network 4, so that the PC 6 can automatically receive a URL included in retrieved information, and share information on the network 4.

As described above, the display control unit 44 included in the document retrieval device according to the fifth embodiment displays a URL included in information retrieved by the retrieving unit 13 in the form of the toggle button. According to the sixth embodiment, the input/output unit 66 transmits the URL in the form of the toggle button to the PC 6. As a result, the PC 6 connected to the document retrieval device 60 via the network 4 can share the URL included in the retrieved information on the network 4. The URL can be transmitted upon receiving an operational input via the operating unit 15a, or automatically transmitted at the time when the URL is added to the toolbar.

The storing unit 67 stores therein retrieved information. The input/output unit 66 transmits the retrieved information stored in the storing unit 67 to the PC 6. Therefore, the PC 6 connected to the document retrieval device 60 via the network 4 can automatically receive the retrieved information, and share the information on the network 4.

The PC 6 can display the received information or the shared information, such as the toggle buttons, information corresponding to the toggle buttons, and retrieved information, on a monitor in a form of a toolbar. Furthermore, the displayed toggle button can be inserted into an application opened in the PC 6 by a user's drag-and-drop operation. As a result, the retrieved information can be shared and freely used among information processing devices connected to the network 4.

Figure 18:
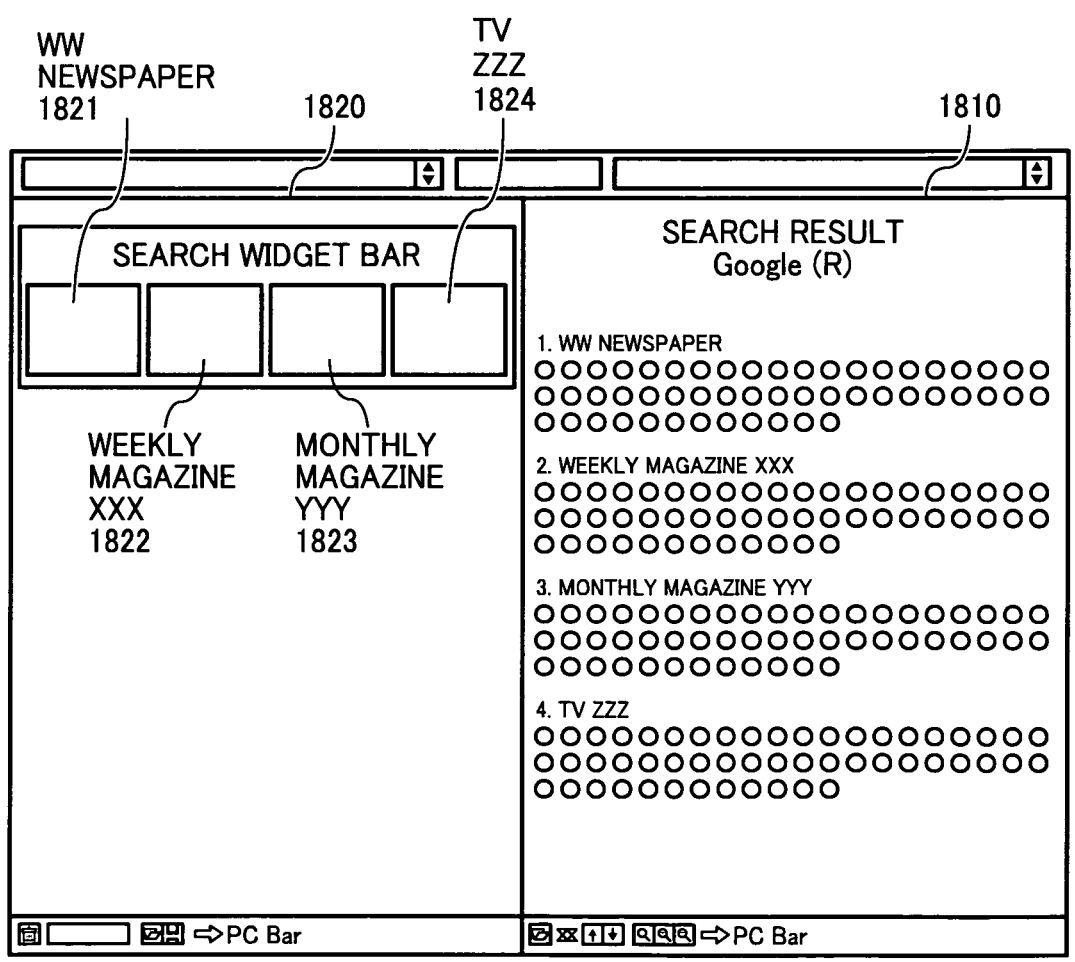
FIG. 18 is a schematic diagram for explaining the contents displayed on a monitor shown in FIG. 17.

FIG. 18 is an enlarged view of contents displayed on the monitor 15b included in the document retrieval device 60. The display control unit 64 displays retrieved information on a screen 1810 in the right side of the monitor 15b and toggle buttons 1821 to 1824 corresponding to the retrieved information respectively in a form of a widget bar on a screen 1820 in the left side of the monitor 15b.

The input/output unit 66 transmits the toggle buttons 1821 to 1824 and the retrieved information corresponding to the toggle buttons 1821 to 1824 to the PC 6. Therefore, the PC 6 connected to the document retrieval device 60 via the network 4 can automatically receive the toggle buttons and the retrieved information corresponding to the toggle buttons, and share the retrieved information by disclosing the retrieved information on the network.

Upon receiving the toggle buttons and the retrieved information from the input/output unit 66, the PC 6 displays the toggle buttons in a form of a widget bar in the same manner as that is shown in FIG. 18, so that a user of the PC 6 can freely use the shared retrieved information.

Figure 19:
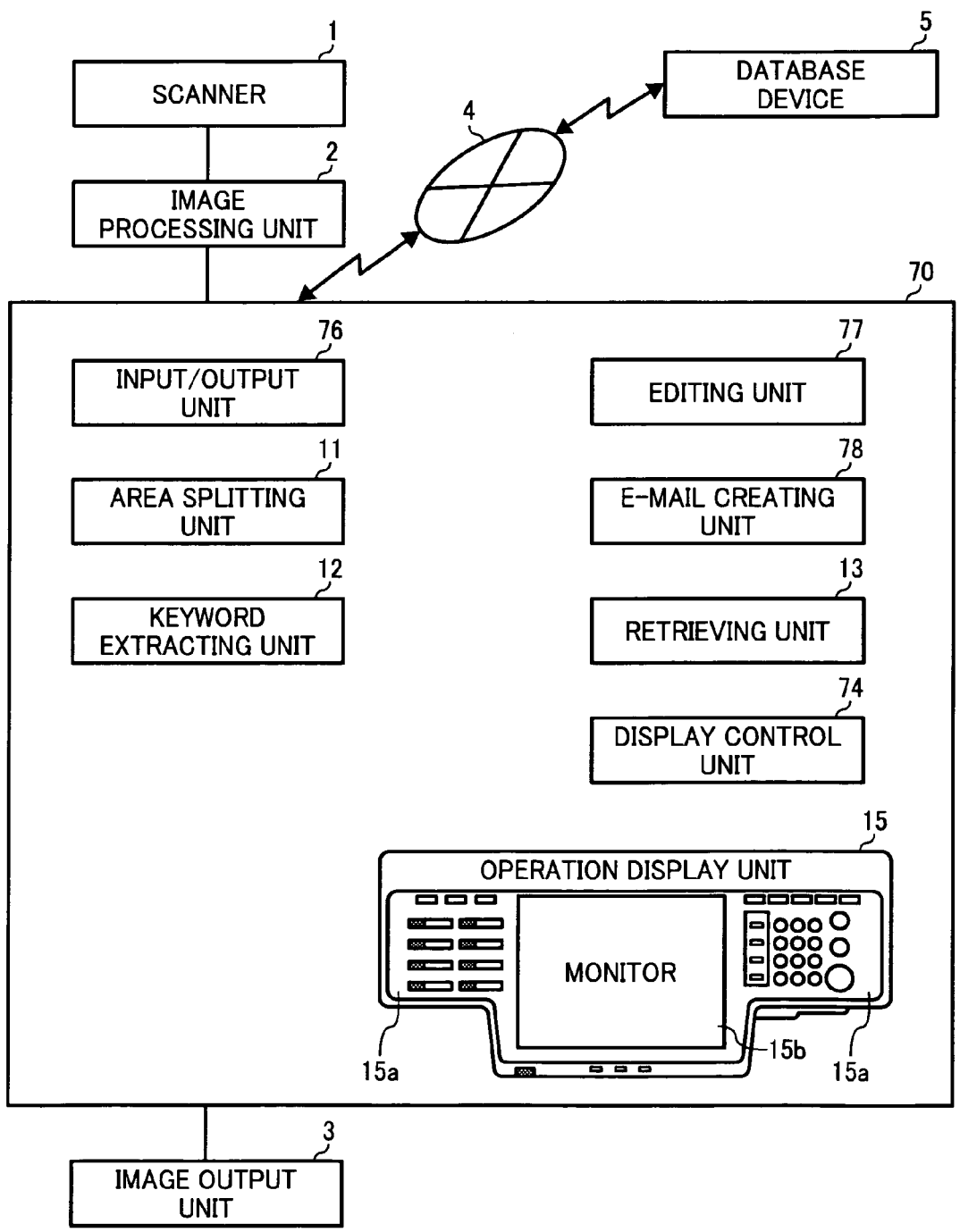
FIG. 19 is a block diagram of an image forming apparatus including a document retrieval device according to a seventh embodiment of the present invention.

FIG. 19 is a block diagram of an image forming apparatus including a document retrieval device 70 according to a seventh embodiment of the present invention. The difference between the document retrieval device 70 and the document retrieval device 10 is that the document retrieval device 70 includes an input/output unit 76 instead of the input/output unit 16 and a display control unit 74 instead of the display control unit 14, and additionally includes an editing unit 77 and an e-mail creating unit 78. The portions that are identical to those shown in FIG. 1 are denoted with the same reference numerals, and the description of those portions is omitted. When the operation display unit 15 receives an operational input for editing retrieved information displayed on the monitor 15b, the editing unit 77 edits the retrieved information. The display control unit 74 displays the retrieved information edited by the editing unit 77 on the monitor 15b. The e-mail creating unit 78 creates an e-mail message containing a content of the retrieved information edited by the editing unit 77.

The input/output unit 76 outputs the retrieved information, which is edited by the editing unit 77 and displayed on the monitor 15b by the display control unit 74. In this manner, the displayed retrieved information can be edited, and the edited retrieved information can be used for other purposes. For example, the e-mail creating unit 78 creates an e-mail message containing a content of the edited retrieved information. The created e-mail message is sent by the input/output unit 76.

Figure 20:
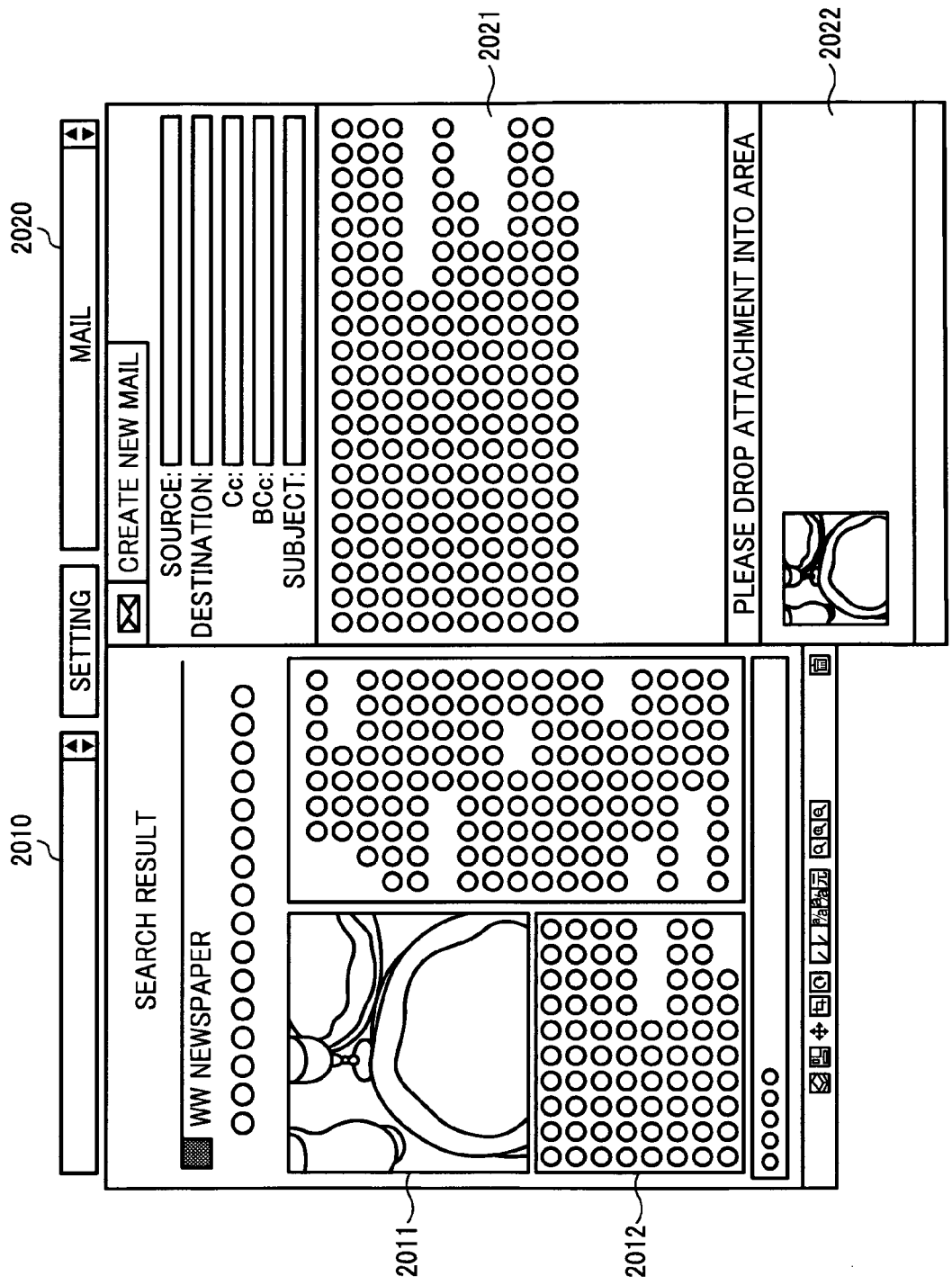
FIG. 20 is a schematic diagram for explaining the contents displayed on a monitor shown in FIG. 19.

FIG. 20 is an enlarged view of the contents displayed on the monitor 15b on which an e-mail message containing a content of edited retrieved information is displayed. As shown in FIG. 20, retrieved information is displayed on a screen 2010 in the left side of the monitor 15b. The retrieved information on the screen 2010 includes a picture subarea 2011 and a text subarea 2012. An e-mail creating screen 2020 is arranged in the right side of the monitor 15b. The e-mail creating screen 2020 includes an e-mail message area 2021 and an attachment box 2022. When the picture subarea 2011 is dragged and dropped into the attachment box 2022, and the text subarea 2012 is dragged and dropped into the e-mail message area 2021, the e-mail creating unit 78 creates an e-mail message identical to the content of the text subarea 2012 with an attachment of a picture image identical to that is in the picture subarea 2011.

Incidentally, the e-mail message can be created in any of an extensible markup language (XML) format, an HTML format, a text format, and the like. A picture image can be attached to an e-mail message direct. Moreover, the e-mail creating unit 78 can create an e-mail message that is converted into a multipurpose Internet mail extensions (MIME) message.

In this manner, in the document retrieval device 70 according to the seventh embodiment, with single application software, a document is scanned by the scanner 1, and a keyword is automatically extracted from the scanned document data to retrieve information relevant to the extracted keyword on the Web, and the retrieved information is displayed on the monitor 15b, and a user can send an e-mail in which the retrieved information is edited. Therefore, the document retrieval device 70 can improve the user-friendliness.

Figure 21:
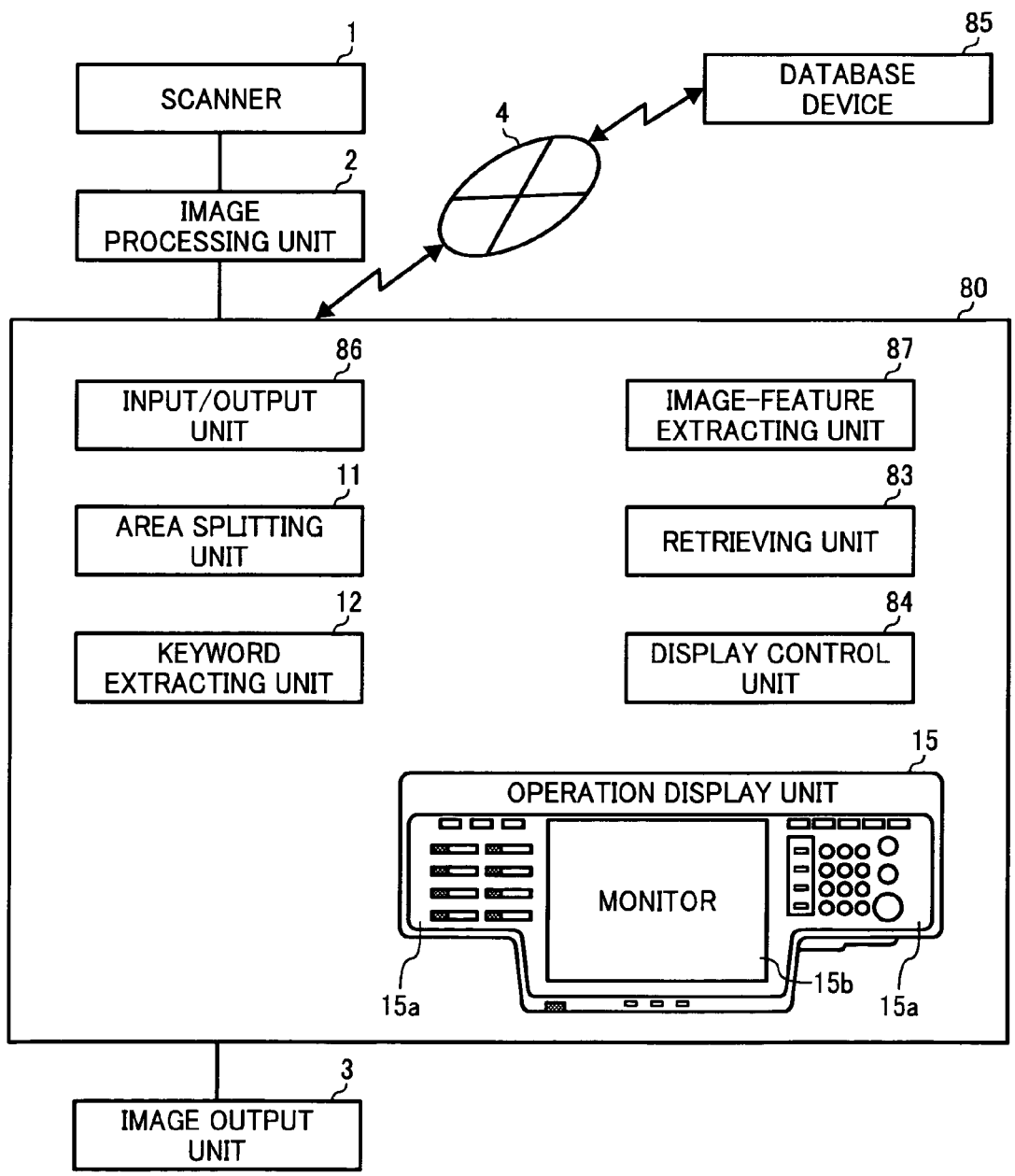
FIG. 21 is a block diagram of an image forming apparatus including a document retrieval device according to an eighth embodiment of the present invention.

FIG. 21 is a block diagram of an image forming apparatus including a document retrieval device 80 according to a eighth embodiment of the present invention. The difference between the document retrieval device 80 and the document retrieval device 10 is that the document retrieval device 80 includes an input/output unit 86 instead of the input/output unit 16, a display control unit 84 instead of the display control unit 14, and a retrieving unit 83 instead of the retrieving unit 13, and additionally includes an image-feature extracting unit 87. The portions that are identical to those shown in FIG. 1 are denoted with the same reference numerals, and the description of those portions is omitted. The image-feature extracting unit 87 extracts a feature of data included in each subarea composing a scanned document data. The retrieving unit 83 transmits the extracted feature and an instruction for retrieving information relevant to the extracted feature to a database device 85 via the network 4. Upon receiving the instruction, the database device 85 searches information relevant to the extracted feature, and transmits the searched information to the document retrieval device 80 via the network 4. Upon receiving the information, the display control unit 84 displays the retrieved information on the monitor 15b as a result of retrieval.

The image-feature extracting unit 87 extracts an image feature, such as a pattern feature, a color feature, and a contrast feature, from image data included in a picture subarea which attribute is analyzed as a picture image by the area splitting unit 11, or extracts a feature from text data relevant to the picture image.

The image feature extracted by the image-feature extracting unit 87 is used as a retrieval key expressed by a vector value. The retrieving unit 83 transmits the vector value as the image feature of the image data to the database device 85 via the network 4.

The database device 85 selects one of stored image data which vector value has the shortest distance to the received vector value in a vector space with an image retrieval function, and transmits the selected image data to the document retrieval device 80 as retrieved image data. Such the image retrieval method is well known to those skilled in the art, so that the detailed description is omitted.

Figure 22:
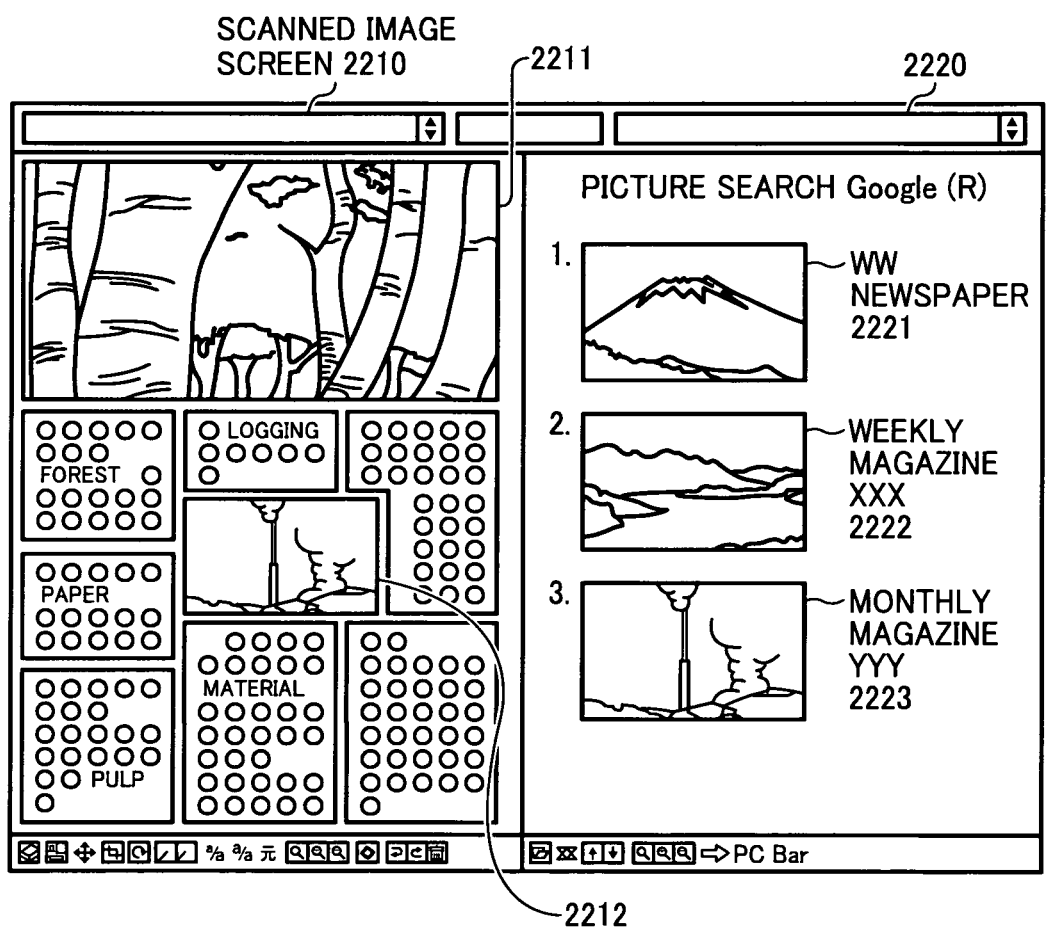
FIG. 22 is a schematic diagram for explaining the contents displayed on a monitor shown in FIG. 21.

FIG. 22 is an enlarged view of the contents displayed on the monitor 15b on which image data retrieved by the document retrieval device 80 is displayed. The area splitting unit 11 analyzes a document image, which is scanned by the scanner 1 and displayed on a screen 2210 in the left side of the monitor 15b, and identifies that the document image includes picture images 2211 and 2212. The image-feature extracting unit 87 extracts image features from the picture images 2211 and 2212, i.e., calculates vector values of the picture images 2211 and 2212.

With the image retrieval function, the database device 85 selects one of stored image data which vector value has the shortest distance to the received vector value subjected to be retrieved, and transmits the selected image data to the document retrieval device 80 as retrieved image data. Upon receiving the retrieved image data from the database device 85, the display control unit 84 displays the retrieved image data on a screen 2220 in the right side of the monitor 15b.

In this manner, in the document retrieval device 80 according to the eighth embodiment, an image feature is automatically extracted from a document image scanned by the scanner 1, and a picture image on the network is retrieved based on the image feature, and the retrieved picture image is downloaded to be displayed on the monitor 15b. Therefore, the image forming apparatus including the document retrieval device 80 can retrieve a relevant picture image on the network by just scanning a picture.

As shown in FIG. 22, it is preferable that the display control unit 84 displays the picture image retrieved by the retrieving unit 83 side-by-side to the picture image data scanned by the scanner 1 on the monitor 15b. As compared with a case of retrieving text data, picture image data is retrieved based on an uncertain element such as an image feature, so that it is convenient for the user to view the retrieved picture image data side-by-side to the scanned image data.

A document retrieval device according to a variation of the eighth embodiment can retrieve information by using a plurality of search methods. The document retrieval device according to the variation of the eighth embodiment has the same configuration as that is of the document retrieval device 80, so that an operation of the document retrieval device according to the variation of the eighth embodiment is explained below with reference to FIG. 22.

In a case of retrieving text data, the retrieving unit 83 retrieves text data based on an extracted keyword. In a case of retrieving picture data, the retrieving unit 83 retrieves picture data based on an image feature extracted from a picture by the image-feature extracting unit 87. Furthermore, in the case of retrieving document data, the retrieving unit 83 issues a search command for limiting the scope of document data subjected to be retrieved.

For example, the scope of document data can be limited to newspaper articles, magazine articles, or information available to the public on the Web. Upon receiving the search command, the database device 85 searches document data within the scope indicated in the search command. On the other hand, in the case of retrieving picture data, picture data is retrieved by using the picture-data retrieval method as explained in the eighth embodiment.

Figure 23:
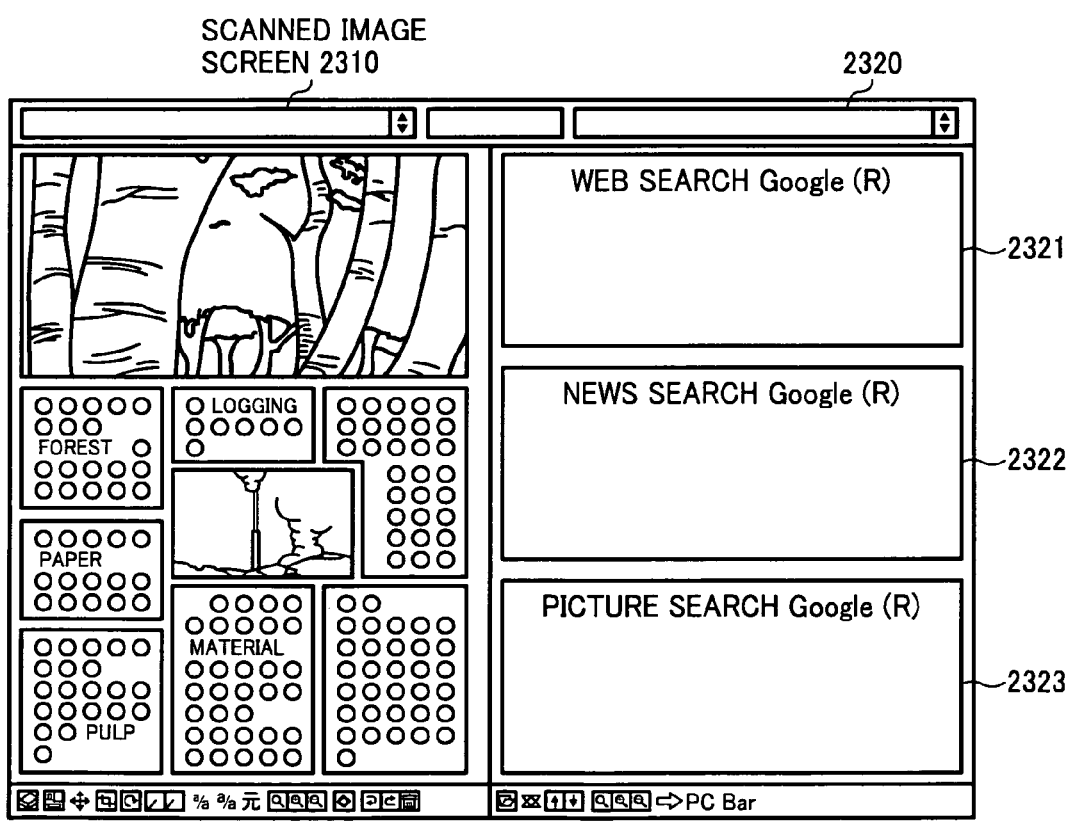
FIG. 23 is a schematic diagram for explaining the contents displayed on a monitor included in a document retrieval device according to a variation of the eighth embodiment.

FIG. 23 is an enlarged view of the contents displayed on the monitor 15b on which information retrieved by the document retrieval device according to the variation of the eighth embodiment is displayed. A document image scanned by the scanner 1 is displayed on a screen 2310 in the left side of the monitor 15b. Any of subareas displayed on the screen 2310 is dragged and dropped into a retrieval screen 2320 in the right side of the monitor 15b by a user.

When any of the subareas is dragged and dropped into a Web search screen 2321 by the user, if there is any data relevant to data included in the subarea on the Web, the relevant data is retrieved and displayed on the Web search screen 2321. When any of the subareas is dragged and dropped into a news search screen 2322 by the user, if there is any news article relevant to data included in the subarea, the news article data is retrieved and displayed on the news search screen 2322. When any of the subareas is dragged and dropped into a picture-image search screen 2323 by the user, if there is any picture image relevant to data included in the subarea, the picture image data is retrieved and displayed on the picture-image search screen 2323.

When the operation display unit 15 receives such a plurality of drag-and-drop operational inputs to drag and drop a plurality of subareas into the different search screen respectively, the retrieving unit 83 retrieves information depending on search methods corresponding to the search screens where the subareas are dragged and dropped.

In this case, retrieved text data and picture data can be displayed side-by-side. Even though attributes of the text data and the picture data are different from each other, contents of the text data and the picture data are identical to each other. Therefore, the text data and the picture data those having the same topic are displayed on the monitor 15b side-by-side, and thereby improving the user-friendliness.

A document retrieval device 90 according to a ninth embodiment of the present invention is applied to a PC (hereinafter, a PC 90). For example, a printer driver is installed on the PC 90, and data subject to printout is displayed on a monitor of the PC 90. The PC 90 receives an input from a user for selecting any of subareas of the data displayed on the monitor, for example, with a mouse or a pointer. Upon receiving the user's input, the PC 90 extracts a keyword from data included in the selected subarea to retrieve information relevant to the extracted keyword on the network, and displays retrieved information on the monitor.

Figure 24:
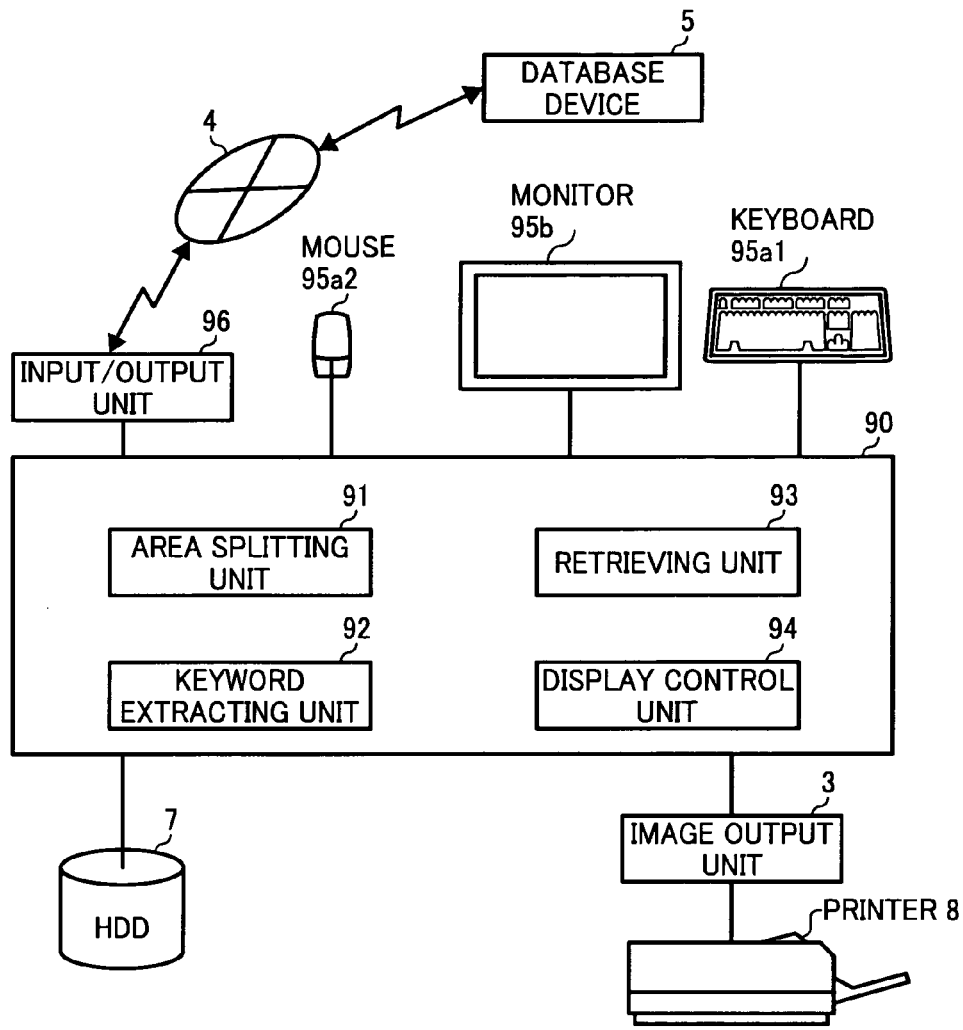
FIG. 24 is a block diagram of a personal computer (PC) as a document retrieval device according to a ninth embodiment of the present invention.

FIG. 24 is a block diagram of the PC 90 according to the ninth embodiment. The PC 90 includes an input/output unit 96 as an input/output (I/O) interface, a keyboard 95a1, a mouse 95a2, a monitor 95b, a hard disk drive (HDD) 7, and the image output unit 3. The image output unit 3 outputs an image to a printer 8, and also serves as an interface, i.e., is capable of being connected to other output devices. In this case, the image output unit 3 is connected to the printer 8. The portions identical to those in FIG. 1 for the first embodiment are denoted with the same reference numerals, and the description of those portions is omitted.

The PC 90 further includes an area splitting unit 91, a keyword extracting unit 92, a retrieving unit 93, and a display control unit 94. A central processing unit (CPU) (not shown) included in the PC 90 reads out a document retrieval program from the HDD 7, and expands the document retrieval program on a random access memory (RAM) (not shown) to execute the document retrieval program.

The input/output unit 96 inputs data described in a page description language (PDL). The data described in the PDL is classified by each data attribute, for example, a text, a chart, picture image data such as a bitmapped image, and the like. Therefore, by reading out data described in the PDL, the area splitting unit 91 can obtain data attributes of the data. The area splitting unit 91 splits a data image into subareas by each data attribute.

As an example of data described in the PDL, upon receiving data as follows:

```
72 72 moveto
/Times-Bolditalic 24 selectfont
```

-continued

```
(Taro Yamada)
show
showpage
``` in accordance with the description in the PDL, the display control unit 94 reads out that the above character strings indicates a Times-Bold italic font which size is 24 points is selected at a position (72, 72), and "Taro Yamada" is displayed.

As another example of data described in the PDL, upon receiving data as follows:

```
newpath
144 72 moveto
144 432 lineto
stroke
showpage
``` in accordance with the description in the PDL, the display control unit 94 reads out that the above character strings indicates a straight line is drawn from a position (144, 72) to a position (144, 432).

As described above, when the PC 90 performs the area splitting process, the PC 90 needs not perform the character recognition by the attribute analysis of each subarea composing image data, which is performed by the document retrieval devices according to the first to eighth embodiments. By reading out data described in the PDL, the PC 90 can easily perform the area splitting process as compared with the document retrieval devices according to the first to eighth embodiments.

The data described in the PDL is read out, and split into subareas by each data attribute, and then displayed on the monitor 95b by the display control unit 94. The user can select any of the subareas displayed on the monitor 95b with the keyboard 95a1 or the mouse 95a2, or by a touch input via the monitor 95b. The user can also input an instruction via the monitor 95b.

In the same manner as explained in the first embodiment, the keyword extracting unit 92 extracts an keyword, and the retrieving unit 93 transmits the extracted keyword and a search command to the database device 5 as a database server via the network 4. Upon receiving information relevant to the keyword from the database device 5, the display control unit 94 displays the retrieved information on the monitor 95b. Moreover, in the same manner as explained in the above embodiments, the input information described in the PDL and the retrieved information are displayed side-by-side.

While the retrieved information is displayed on the monitor 95b, if the image output unit 3 receives a printout command from the user via the keyboard 95a1 or the like, the image output unit 3 runs a driver program to cause the printer 8 to print out the retrieved information. It is also possible to create and send an e-mail message containing a content of the retrieved information.

Figure 25:
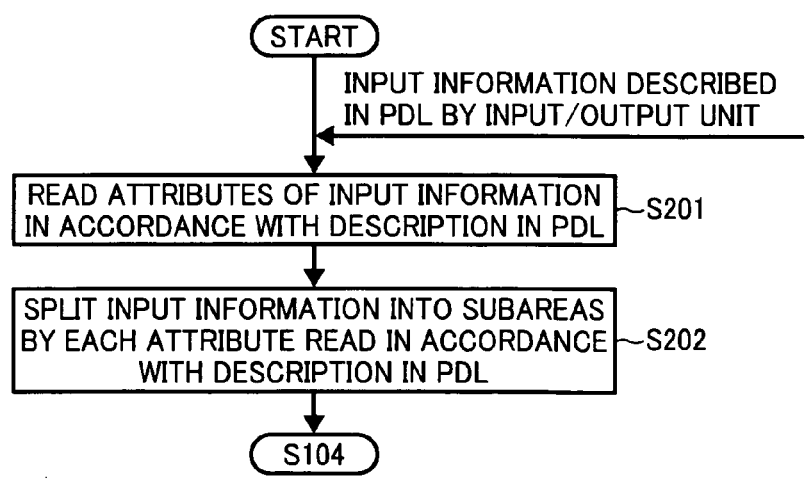
FIG. 25 is a flowchart for explaining a document retrieval process performed by the PC according to the ninth embodiment.

FIG. 25 is a flowchart for explaining a document retrieval process performed by the PC 90. The area splitting unit 91 receives information described in the PDL, and reads out data attributes and subareas of the information in accordance with the description in the PDL (step S201). The area splitting unit 91 splits the information into subareas by each of the data attributes read in accordance with the description in the PDL (step S202). A Subsequent step is identical to step S104 shown in FIG. 8 for the first embodiment, and the description of the step S104 is omitted.

In this manner, in the PC 90 according to the ninth embodiment, upon receiving data described in the PDL, data attributes of the data are read out based on the description in the PDL, and the data is split into subareas by each of the data attributes, and a keyword is extracted from data included in each of subareas which data attribute is a text, and information relevant to the extracted keyword is retrieved. Therefore, if an input document is in the PDL, the PC 90 can easily retrieve information relevant to a content of the document from a number of database devices on the network without any cumbersome keyboard operation. According to the ninth embodiment, the PC can retrieve information relevant to a content of the received data in a form of an electronic medium with a simple operation.

The PC 90 according to the ninth embodiment can be configured to handle data that is described in a language other than the PDL. As long as data attributes and subareas of data can be read out by application software, the PC 90 can cope with data described in any other languages.

A mobile phone according to a tenth embodiment of the present invention includes a CCD camera and a monitor. A keyword is extracted from a picture image shot by the CCD camera to retrieve information relevant to the extracted keyword on the network. Retrieved information is displayed on the monitor.

Figure 26:
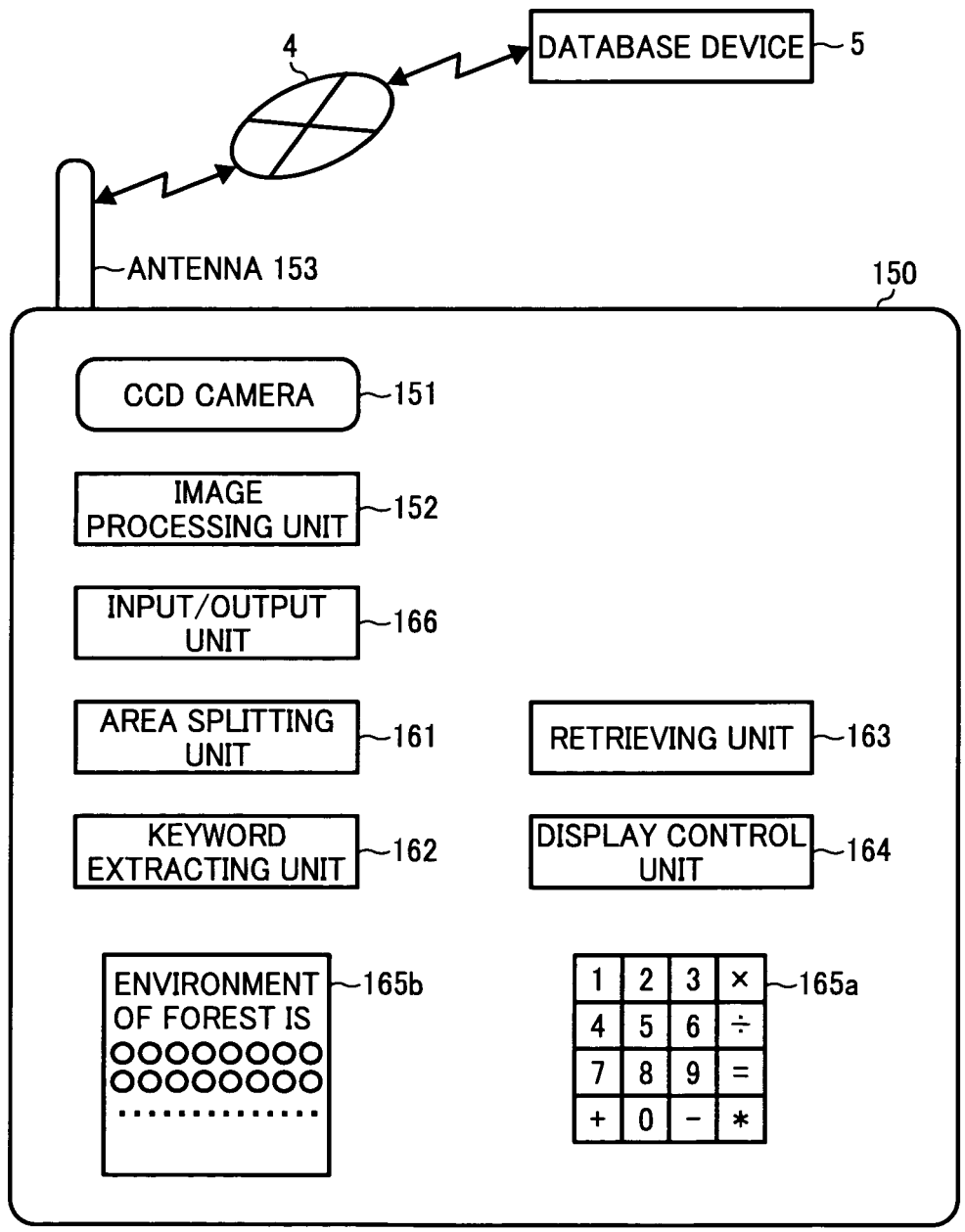
FIG. 26 is a schematic diagram of a mobile phone as a document retrieval device according to a tenth embodiment of the present invention.

FIG. 26 is a block diagram of a mobile phone 150 according to the tenth embodiment. The mobile phone 150 includes a CCD camera 151, an image processing unit 152, an area splitting unit 161, a keyword extracting unit 162, a retrieving unit 163, a display control unit 164, a monitor 165b, an operating unit 165a, an input/output unit 166, and an antenna 153.

The image processing unit 152 processes a picture image shot by the CCD camera 151, such as a digital transformation or a gamma transformation of the picture image. For example, the image processing unit 2 transforms the picture image into a bitmapped image as image data, and outputs the image data to the area splitting unit 161 via the input/output unit 166.

In the same manner as the area splitting units according to the first to ninth embodiments, the area splitting unit 161 splits the received data into a text subarea including a text image and a subarea including an image other than a text image. The keyword extracting unit 162 extracts a keyword in the same manner as the keyword extracting units according to the first to ninth embodiments. The retrieving unit 163 retrieves information relevant to the extracted keyword in the same manner as the retrieving units according to the first to ninth embodiments. The display control unit 164 displays retrieved information on the monitor 165b in the same manner as the display control units according to the first to ninth embodiments.

The input/output unit 166 receives/transfers information on the network via the antenna 153. Furthermore, the input/output unit 166 outputs voice information via an earphone (not shown), and collects voice information via a speakerphone (not shown), and also establishes communication on a communication line via the antenna 153 by the application of a voice conversion such as a code excited linear prediction (CELP).

As described above, in the mobile phone 150 according to the tenth embodiment, an image is shot by the CCD camera 151, and a keyword is extracted from the image to retrieve information relevant to the extracted keyword, and retrieved information is displayed on the monitor 165b.

The retrieving unit 163 can be configured to include an image-feature extracting function so that the database device 5, which is connected to the mobile phone 150 via the network 4, can search any relevant picture images on the network based on an image feature of a picture image shot by the CCD camera 151. The retrieved picture image is displayed on the monitor 165b.

Figure 27:
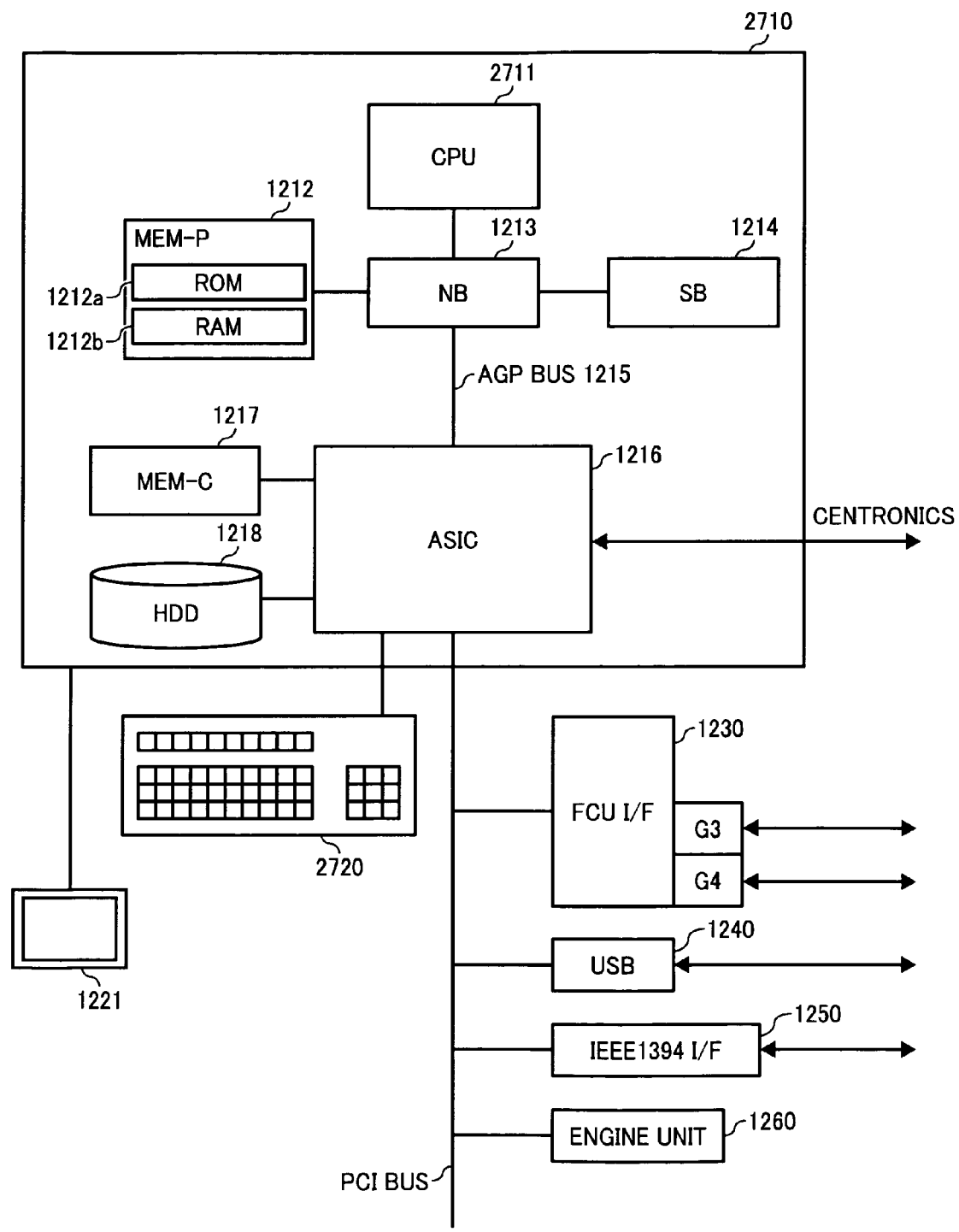
FIG. 27 is a block diagram of the hardware configuration of the image forming apparatus including the document retrieval device according to the first embodiment.

FIG. 27 is a block diagram for explaining a hardware configuration of the image forming apparatus including the document retrieval device 10 according to the first embodiment. The image forming apparatus is a multifunction product (MFP) including multiple functions such as a facsimile machine and a scanner. As shown in FIG. 27, in the MFP, a controller 2710 is connected to an engine unit 1260 via a peripheral component interconnect (PCI) bus. The controller 2710 is used for controlling an input from an FCU interface (I/F) 1230 or an operating unit 2720 so as to control the entire MFP, the image display, the image processing, the document retrieval, and the like. The engine unit 1260 is, for example, an image processing engine capable of being connected to the PCI bus, and performs image processing, such as an error diffusion or a gamma transformation, with respect to retrieved image data.

The controller 2710 includes a CPU 2711, a north bridge (NB) 1213, a system memory (MEM-P) 1212, a south bridge (SB) 1214, a local memory (MEM-C) 1217, an application specific integrated circuit (ASIC) 1216, and an HDD 1218. The NB 1213 is connected to the ASIC 1216 via an accelerated graphics port (AGP) bus 1215. The MEM-P 1212 includes a read only memory (ROM) 1212a and a random access memory (RAM) 1212b.

The CPU 2711 controls the entire MFP, and includes a chip set composed of the NB 1213, the MEM-P 1212, and the SB 1214. The CPU 2711 is connected to other devices via the chip set.

The NB 1213 is a bridge for connecting the CPU 2711 to the MEM-P 1212, the SB 1214, and the AGP bus 1215. The NB 1213 includes a memory controller for controlling read/write to the MEM-P 1212, a PCI master, and an AGP target.

The MEM-P 1212 is a system memory used to store programs or data therein and also to expand the programs or the data. The ROM 1212a is a read only memory used to store programs or data therein. The RAM 1212b is a writable/readable memory used to expand programs or data and also to draw an image at the time of image processing.

The SB 1214 is a bridge for connecting the NB 1213 to PCI devices and peripheral devices. The SB 1214 is connected to the NB 1213 via the PCI bus. The FCU I/F 1230 and the like are connected to the PCI bus.

The ASIC 1216 is an integrated circuit (IC) for processing multimedia information, i.e., includes a hardware element for processing multimedia information. The ASIC 1216 also serves as a bridge for connecting the AGP bus 1215 to the PCI bus, and the HDD 1218 to the MEM-C 1217.

A universal serial bus (USB) 1240 and the Institute of Electrical and Electronics Engineers (IEEE) 1394 I/F 1250 are connected to the ASIC 1216 via the PCI bus among a PCI target, an AGP master, an arbiter (ARB) forming the core of the ASIC 1216, a memory controller for controlling the MEM-C 1217, a plurality of direct memory access controllers (DMAC) that rotate image data with a hardware logic, and the engine unit 1260.

The MEM-C 1217 is a local memory used as a send-image buffer or a code buffer. The HDD 1218 is a storage in which image data, programs, font data, forms are stored.

The AGP bus 1215 is a bus interface for a graphics accelerator card made for high-speed graphics processing. The graphics accelerator card achieves the high-speed graphics processing by direct accessing to the MEM-P 1212 at high throughput.

The operating unit (touch panel) 2720 connected to the ASIC 1216 receives an operational input from a user, and transmits information on the received operational input to the ASIC 1216.

A document retrieval program executed by the MFP according to the first embodiment is stored in the ROM or the like in advance.

Alternatively, the document retrieval program to be executed by the MFP according to the first embodiment can be stored in a computer-readable recording medium, such as a compact disk read only memory (CD-ROM), a flexible disk (FD), a compact disk recordable (CD-R), and a digital versatile disk (DVD), in a form of an installable and executable file.

Furthermore, the document retrieval program to be executed by the MFP according to the first embodiment can stored on a computer connected to a network such as the Internet, and downloaded to the MFP via the network. Moreover, an image displaying program and an image forming program to be executed by the MFP according to the first embodiment can be provided or distributed via the network such as the Internet.

The document retrieval program to be executed by the MFP according to the first embodiment is composed of modules including the above-mentioned units (for example, the area splitting unit 11, the keyword extracting unit 12, the retrieving unit 13, the display control unit 14, and the like). As for actual hardware, the CPU (processor) reads out the document retrieval program from the ROM, and executes the document retrieval program, and thereby loading the above-mentioned units onto a main storage unit so that the units such as the area splitting unit 11, the keyword extracting unit 12, the retrieving unit 13, and the display control unit 14 are created on the main storage unit.

Figure 28:
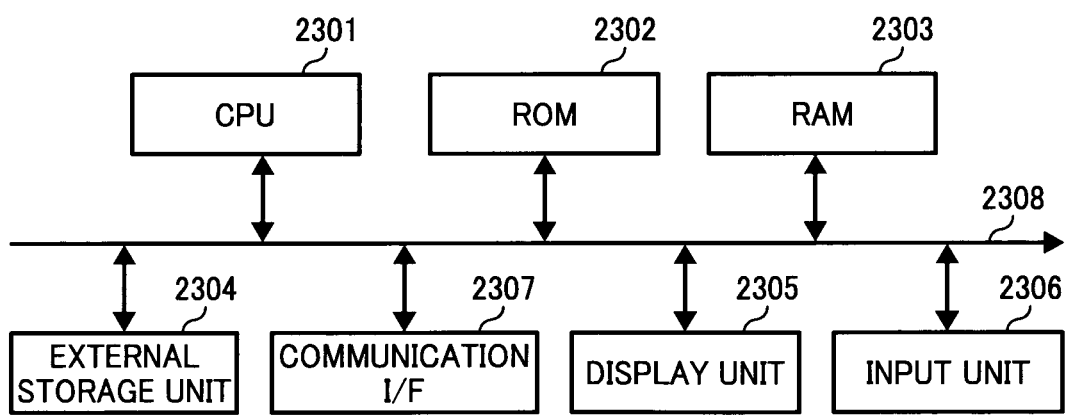
FIG. 28 is a block diagram of the hardware configuration of the PC according to the ninth embodiment.

FIG. 28 is a block diagram for explaining a hardware configuration of the PC 90 according to the ninth embodiment. As shown in FIG. 28, the PC 90 has a common hardware configuration including a control unit such as a CPU 2301, a storage unit such as a ROM 2302 and a RAM 2303, an external storage unit 2304 such as an HDD and a CD drive, a display unit 2305 such as a monitor, an input unit 2306 such as a keyboard and a mouse, a communication I/F 2307, and a bus 2308 for connecting these units to one another.

A document retrieval program to be executed by the PC 90 according to the ninth embodiment is stored in a computer-readable recording medium, such as a CD-ROM, an FD, a CD-R, and a DVD, in a form of an installable and executable file.

Furthermore, the document retrieval program to be executed by the PC 90 can stored on a computer connected to a network such as the Internet, and downloaded to the PC 90 via the network. Moreover, the document retrieval program to be executed by the PC 90 can be provided or distributed via the network such as the Internet. Furthermore, the document retrieval program to be executed by the PC 90 can be stored in the ROM or the like in advance.

Furthermore, the document retrieval program to be executed by the PC 90 is composed of modules including the above-mentioned units (for example, the area splitting unit 11, the keyword extracting unit 12, the retrieving unit 13, the display control unit 14, and the like). As for actual hardware, the CPU (processor) 2301 reads out the document retrieval program from the storage unit, and executes the document retrieval program, and thereby loading the above-mentioned units onto a main storage unit so that the units such as the area splitting unit 11, the keyword extracting unit 12, the retrieving unit 13, and the display control unit 14 are created on the main storage unit.

In this manner, as the embodiments of the present invention, the cases of the image forming apparatus, the PC, and the mobile phone are explained above. The above-explained embodiments and variations are just examples for explaining the invention, and the present invention is not limited to the above-explained embodiments and variations.

As described above, the device, method, and the computer program product for information retrieval according to the present invention are useful in document retrieval, especially when retrieving digital information from non-digital information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus, including an information retrieval device that is connected to a network, the information retrieval device comprising:
   a scanner that automatically reads out paper-based non-digital information;
   an image processing unit that performs an image transformation process including a digital transformation or a gamma transformation, and thereby generates a processed document image including a bitmap image, with respect to a document image acquired by the scanner;
   an input/output unit that receives the processed document image from the image processing unit;
   a display unit that includes an operation screen, and wherein the operation screen includes a first screen and a second screen, and wherein input information received from the input/output unit is displayed on the first screen, and wherein a result of retrieval is displayed on the second screen, and a user can perform an operational input from the first screen and the second screen;
   an area splitting unit that receives the processed document image from the input/output unit and splits the processed document image into a plurality of subareas by each information attribute;
   an extracting unit that includes a keyword dictionary storing words that function as keywords, and which is configured to:
      extract a retrieval key from the input information in each of the subareas; and
      split character strings included in a text subarea by each morpheme by application of a morphological analysis;
   a determining unit configured to:
      determine whether each of the character strings by each morpheme matches with any of the keywords stored in the keyword dictionary; and
      narrow down candidate keywords by the application of an algorithm based on conditions and a frequency of appearance, and thereby determine a keyword, wherein the extracting unit extracts the matching character string as a candidate keyword, when the character string matches with the keyword;
   a display control unit that displays the input information in the subareas on the first screen, and receives an instruction for specifying any of the subareas displayed on the first screen of the operation screen to be moved to the second screen of the operation screen, such that the instruction for specifying any of the subareas displayed on the first screen is for moving a specified subarea on the operation screen; and
 a retrieving unit that retrieves information via the network based on a retrieval key corresponding to the subarea that is moved to the second screen, and wherein the retrieving unit is configured to retrieve information via the network while the input information is displayed on the first screen of the operation screen, wherein the display control unit displays retrieved information on the second screen.

2. The information retrieval device according to claim 1, wherein the subareas include a text subarea including a text image and a non-text subarea including an image other than a text image, the extracting unit extracts a keyword as the retrieval key from the text image included in the text subarea, and the retrieving unit retrieves information via the network based on the keyword extracted from the text image included in the text subarea when the text subarea is moved to the second screen.

3. The information retrieval device according to claim 2, wherein the display control unit displays an instruction for specifying the keyword extracted by the extracting unit on the first screen in addition to the input information in the subareas.

4. The information retrieval device according to claim 3, wherein when a user selects the instruction via the first screen, the retrieving unit retrieves information via the network based on the keyword specified in the instruction.

5. The information retrieval device according to claim 3, wherein when a plurality of keywords is extracted from text images included in a plurality of text subareas by the extracting unit, the display control unit displays a plurality of instructions respectively for specifying the keywords on the first screen in addition to the input information split into the subareas, and when the user selects the instructions via the first screen, the retrieving unit retrieves information via the network by applying logical AND or logical OR to the keywords specified in the instructions.

6. The information retrieval device according to claim 3, wherein upon receiving a new keyword input by the user, the display control unit displays an instruction for specifying the new keyword on the first screen in addition to the instruction for specifying the keyword extracted by the extracting unit and the input information split into the subareas.

7. The information retrieval device according to claim 6, further comprising a character recognizing unit that recognizes a character included in an image, wherein the display control unit receives a new keyword handwritten input by the user, and the character recognizing unit recognizes a handwritten keyword, and outputs a result of word recognition as the new keyword.

8. The information retrieval device according to claim 1, wherein the area splitting unit splits the input information into a picture subarea including a picture image and a non-picture subarea including an image other than a picture image, the extracting unit extracts an image feature of the picture image included in the picture subarea as the retrieval key, and when the picture subarea is moved to the second screen, the retrieving unit retrieves information via the network based on the image feature extracted by the extracting unit.

9. The information retrieval device according to claim 1, wherein the display control unit receives a selection or a release of the selection with respect to any of the subareas displayed on the first screen, and displays a selected subarea on the display unit in a different manner from subareas that are not selected, and the extracting unit extracts a retrieval key from information included in the selected subarea.

10. The information retrieval device according to claim 1, wherein the retrieving unit retrieves information by using a plurality of retrieval methods, the display unit displays thereon the retrieval methods, the display control unit receives inputs for moving selected subareas respectively to any of the retrieval methods displayed on the display unit, and the retrieving unit retrieves information by using retrieval methods to which the selected subareas are respectively moved.

11. The information retrieval device according to claim 1, wherein the display control unit receives a touch input for specifying any of the subareas displayed on the first screen to be moved to the second screen.

12. The information retrieval device according to claim 1, wherein the display control unit receives a drag-and-drop operational input for specifying any of the subareas displayed on the first screen to be moved to the second screen with a pointing device.

13. The information retrieval device according to claim 1, wherein the input information is information on a document image scanned by an image forming apparatus as the input unit.

14. The information retrieval device according to claim 1, wherein the input information is information on a picture image shot by an imaging device as the input unit.

15. A method of retrieving information from a network, the method comprising:
 providing an image forming apparatus that includes a display unit, and wherein the display unit includes an operation screen, and wherein the operation screen includes a first screen and a second screen;
 processing a document image acquired by a scanner by digital transformation or gamma transformation;
 receiving input information from an input unit, and displaying the input information on the first screen, and displaying a result of retrieval on the second screen, wherein a user can perform an operational input from the first screen and the second screen;
 splitting the input information into a plurality of subareas by each information attribute;
 extracting a retrieval key from the input information in each of the subareas;
 splitting character strings included in a text subarea by each morpheme by application of a morphological analysis;
 determining whether each of the character strings by each morpheme matches with any of the keywords stored in a keyword dictionary;
 extracting the matching character string as a candidate keyword, when the character string matches with the keyword;
 narrowing down candidate keywords by the application of an algorithm based on conditions and a frequency of appearance, and thereby determining a keyword;
 providing a control to display the input information in the subareas on the first screen, and receiving an instruction for specifying any of the subareas displayed on the first screen of the operation screen to be moved to the second screen of the operation screen, such that the instruction for specifying any of the subareas displayed on the first screen is for moving a specified subarea on the operation screen; and
 retrieving information via the network based on a retrieval key corresponding to the subarea that is moved to the second screen, and wherein the retrieving of information via the network is performed while the input information is displayed on the first screen of the operation screen, wherein providing a control includes displaying retrieved information on the second screen.

16. A computer program product comprising a non-transitory computer-usable medium having computer-readable program codes embodied in the medium that contains a computer program which when executed on a computer causes the computer to execute a method of operating an image forming apparatus that includes a display unit, and wherein the display unit includes an operation screen, and wherein the operation screen includes a first screen and a second screen, and wherein the method comprises:

processing a document image acquired by a scanner by digital transformation or gamma transformation;

receiving input information from an input unit, and displaying the input information on the first screen, and displaying a result of retrieval on the second screen, the first screen and the second screen enabling to receive an operational input from a user;

splitting the input information into a plurality of subareas by each information attribute;

extracting a retrieval key from the input information in each of the subareas;

splitting character strings included in a text subarea by each morpheme by application of a morphological analysis;

determining whether each of the character strings by each morpheme matches with any of the keywords stored in a keyword dictionary;

extracting the matching character string as a candidate keyword, when the character string matches with the keyword;

narrowing down candidate keywords by the application of an algorithm based on conditions and a frequency of appearance, and thereby determining a keyword;

providing a control to display the input information in the subareas on the first screen, and receiving an instruction for specifying any of the subareas displayed on the first screen of the operation screen to be moved to the second screen of the operation screen, such that the instruction for specifying any of the subareas displayed on the first screen is for moving a specified subarea on the operation screen; and retrieving information via the network based on a retrieval key corresponding to the subarea that is moved to the second screen, and wherein the retrieving of information via the network is performed while the input information is displayed on the first screen of the operation screen, wherein providing a control includes displaying retrieved information on the second screen.

\* \* \* \* \*